United States Patent
Wu et al.

(10) Patent No.: US 11,843,606 B2
(45) Date of Patent: Dec. 12, 2023

(54) DETECTING ABNORMAL DATA ACCESS BASED ON DATA SIMILARITY

(71) Applicant: ExtraHop Networks, Inc., Seattle, WA (US)

(72) Inventors: Xue Jun Wu, Seattle, WA (US); Swagat Dasgupta, Kirkland, WA (US); Matthew Alexander Schurr, Mercer Island, WA (US)

(73) Assignee: ExtraHop Networks, Inc., Seattle, WA (US)

(*) Notice: Subject to any disclaimer, the term of this patent is extended or adjusted under 35 U.S.C. 154(b) by 0 days.

(21) Appl. No.: 17/708,311

(22) Filed: Mar. 30, 2022

(65) Prior Publication Data

US 2023/0319047 A1 Oct. 5, 2023

(51) Int. Cl.
*H04L 9/40* (2022.01)
*H04L 67/06* (2022.01)
(Continued)

(52) U.S. Cl.
CPC .......... *H04L 63/102* (2013.01); *G06F 18/214* (2023.01); *G06F 21/6263* (2013.01); *H04L 63/20* (2013.01); *H04L 67/06* (2013.01)

(58) Field of Classification Search
CPC ....... H04L 63/102; H04L 63/20; H04L 67/06; G06F 21/6263; G06K 9/6256
See application file for complete search history.

(56) References Cited

U.S. PATENT DOCUMENTS

| 5,027,269 A | 6/1991 | Grant et al. |
| 5,430,727 A | 7/1995 | Callon |

(Continued)

FOREIGN PATENT DOCUMENTS

| AU | 2003287262 A1 | 5/2004 |
| AU | 2008328833 A1 | 6/2009 |

(Continued)

OTHER PUBLICATIONS

Office Communication for U.S. Appl. No. 13/831,673 dated Sep. 30, 2013, pp. 1-10.
(Continued)

*Primary Examiner* — Harris C Wang
(74) *Attorney, Agent, or Firm* — John W. Branch; Branch Partners PLLC

(57) ABSTRACT

Embodiments are directed monitoring network traffic using network monitoring computers. Activity associated with a document in a network may be determined based on the network traffic. A profile may be generated based on a summarization of the activity associated with the document such that the profile may be stored in a data store that stores other profiles. Similar profiles may be determined based on a classification of each profile in the data store based on similarities between the profile and the other profiles in the data store. In response to determining similar profiles, locations in the network associated with documents that correspond to the similar profiles may be determined. Locations may be classified based on the activity, the similar profiles and access policies. In response to portions of the locations being classified as inconsistent with the access policies may be reported.

30 Claims, 15 Drawing Sheets

(51) Int. Cl.
  *G06F 21/62* (2013.01)
  *G06F 18/214* (2023.01)

(56) References Cited

U.S. PATENT DOCUMENTS

| | | | |
|---|---|---|---|
| 5,541,995 A | 7/1996 | Normile et al. |
| 5,548,646 A | 8/1996 | Aziz et al. |
| 5,715,464 A | 2/1998 | Crump et al. |
| 5,787,237 A | 7/1998 | Reilly |
| 5,802,599 A | 9/1998 | Cabrera et al. |
| 5,835,726 A | 11/1998 | Shwed et al. |
| 5,857,188 A | 1/1999 | Douglas |
| 5,928,363 A | 7/1999 | Ruvolo |
| 6,058,429 A | 5/2000 | Ames et al. |
| 6,141,686 A | 10/2000 | Jackowski et al. |
| 6,263,049 B1 | 7/2001 | Kuhn |
| 6,321,338 B1 | 11/2001 | Porras et al. |
| 6,385,729 B1 | 5/2002 | DiGiorgio et al. |
| 6,401,150 B1 | 6/2002 | Reilly |
| 6,405,250 B1 | 6/2002 | Lin et al. |
| 6,412,000 B1 | 6/2002 | Riddle et al. |
| 6,526,044 B1 | 2/2003 | Cookmeyer, II et al. |
| 6,560,636 B2 | 5/2003 | Cohen et al. |
| 6,636,838 B1 | 10/2003 | Perlman et al. |
| 6,704,311 B1 | 3/2004 | Chuah et al. |
| 6,704,874 B1 | 3/2004 | Porras et al. |
| 6,765,909 B1 | 7/2004 | Sen et al. |
| 6,807,156 B1 | 10/2004 | Veres et al. |
| 6,807,565 B1 | 10/2004 | Dodrill et al. |
| 6,883,015 B1 | 4/2005 | Geen et al. |
| 6,901,517 B1 | 5/2005 | Redmore |
| 6,944,599 B1 | 9/2005 | Vogel et al. |
| 6,948,060 B1 | 9/2005 | Ramanathan |
| 6,968,554 B1 | 11/2005 | Macdonald et al. |
| 6,999,729 B2 | 2/2006 | Wandel |
| 7,042,888 B2 | 5/2006 | Berggreen |
| 7,047,303 B2 | 5/2006 | Lingafelt et al. |
| 7,089,326 B2 | 8/2006 | Boucher et al. |
| RE39,360 E | 10/2006 | Aziz et al. |
| 7,133,365 B2 | 11/2006 | Klinker et al. |
| 7,143,153 B1 | 11/2006 | Black et al. |
| 7,177,930 B1 | 2/2007 | LoPresti |
| 7,181,769 B1 | 2/2007 | Keanini et al. |
| 7,193,968 B1 | 3/2007 | Kapoor et al. |
| 7,222,366 B2 | 5/2007 | Bruton, III et al. |
| 7,313,141 B2 | 12/2007 | Kan et al. |
| 7,342,897 B1 | 3/2008 | Nader et al. |
| 7,424,532 B1 | 9/2008 | Subbiah |
| 7,454,499 B2 | 11/2008 | Cantrell et al. |
| 7,457,870 B1 | 11/2008 | Lownsbrough et al. |
| 7,474,654 B2 | 1/2009 | Guru |
| 7,480,292 B2 | 1/2009 | Busi et al. |
| 7,509,680 B1 | 3/2009 | Sallam |
| 7,535,906 B2 | 5/2009 | Engbersen et al. |
| 7,543,146 B1 | 6/2009 | Karandikar et al. |
| 7,545,499 B2 | 6/2009 | Overbeck et al. |
| 7,554,983 B1 | 6/2009 | Muppala |
| 7,561,517 B2 | 7/2009 | Klinker et al. |
| 7,580,356 B1 | 8/2009 | Mishra et al. |
| 7,602,731 B2 | 10/2009 | Jain |
| 7,606,706 B1 | 10/2009 | Rubin et al. |
| 7,609,630 B2 | 10/2009 | Gobeil |
| 7,594,273 B2 | 11/2009 | Keanini et al. |
| 7,619,988 B2 | 11/2009 | Shimada et al. |
| 7,620,986 B1 | 11/2009 | Jagannathan et al. |
| 7,636,305 B1 | 12/2009 | Taylor et al. |
| 7,639,613 B1 | 12/2009 | Ghannadian et al. |
| 7,644,150 B1 | 1/2010 | Nucci et al. |
| 7,660,883 B2 | 2/2010 | Fowlow |
| 7,724,905 B1 | 5/2010 | Bleumer et al. |
| 7,739,497 B1 | 6/2010 | Fink et al. |
| 7,774,456 B1 | 8/2010 | Lownsbrough et al. |
| 7,809,829 B2 | 10/2010 | Kelly et al. |
| 7,810,151 B1 | 10/2010 | Guruswamy |
| 7,817,549 B1 | 10/2010 | Kasralikar et al. |
| 7,849,502 B1 | 12/2010 | Bloch et al. |
| 7,864,764 B1 | 1/2011 | Ma et al. |
| 7,916,652 B1 | 3/2011 | Lima et al. |
| 7,936,682 B2 | 5/2011 | Singh et al. |
| 7,937,755 B1 | 5/2011 | Guruswamy |
| 7,944,822 B1 | 5/2011 | Nucci et al. |
| 7,975,139 B2 | 7/2011 | Coulier |
| 7,979,555 B2 | 7/2011 | Rothstein et al. |
| 7,979,694 B2 | 7/2011 | Touitou et al. |
| 8,040,798 B2 | 10/2011 | Chandra et al. |
| 8,079,083 B1 | 12/2011 | Bennett et al. |
| 8,102,783 B1 | 1/2012 | Narayanaswamy et al. |
| 8,107,397 B1 | 1/2012 | Bagchi et al. |
| 8,125,908 B2 | 2/2012 | Rothstein et al. |
| 8,185,953 B2 | 5/2012 | Rothstein et al. |
| 8,194,542 B2 | 6/2012 | Väänänen et al. |
| 8,352,725 B1 | 1/2013 | O'Toole, Jr. |
| 8,402,540 B2 | 3/2013 | Kapoor et al. |
| 8,411,677 B1 | 4/2013 | Colloff |
| 8,418,249 B1 | 4/2013 | Nucci et al. |
| 8,443,190 B2 | 5/2013 | Breton et al. |
| 8,457,127 B2 | 6/2013 | Eastham et al. |
| 8,494,985 B1 | 7/2013 | Keralapura et al. |
| 8,533,254 B1 | 9/2013 | Whitson, Jr. et al. |
| 8,555,383 B1 | 10/2013 | Marhsall et al. |
| 8,561,177 B1 | 10/2013 | Aziz et al. |
| 8,577,817 B1 | 11/2013 | Keralapura et al. |
| 8,578,024 B1 | 11/2013 | Keralapura et al. |
| 8,601,531 B1 * | 12/2013 | Zolfonoon ............ G06F 21/604 726/4 |
| 8,613,089 B1 | 12/2013 | Holloway et al. |
| 8,619,579 B1 | 12/2013 | Rothstein et al. |
| 8,627,422 B2 | 1/2014 | Hawkes et al. |
| 8,635,441 B2 | 1/2014 | Frenkel et al. |
| 8,667,151 B2 | 3/2014 | Mizikovsky et al. |
| 8,699,357 B2 | 4/2014 | Deshpande et al. |
| 8,707,440 B2 | 4/2014 | Gula et al. |
| 8,744,894 B2 | 6/2014 | Christiansen et al. |
| 8,782,393 B1 | 7/2014 | Rothstein et al. |
| 8,817,655 B2 | 8/2014 | Szabo et al. |
| 8,843,627 B1 | 9/2014 | Baldi et al. |
| 8,848,744 B1 | 9/2014 | Rothstein et al. |
| 8,861,397 B2 | 10/2014 | Kind et al. |
| 8,959,643 B1 | 2/2015 | Invernizzi et al. |
| 8,964,548 B1 | 2/2015 | Keralapura et al. |
| 8,971,196 B2 | 3/2015 | Degioanni et al. |
| 9,026,467 B2 | 5/2015 | Bammi et al. |
| 9,036,493 B2 | 5/2015 | Degioanni et al. |
| 9,038,178 B1 | 5/2015 | Lin |
| 9,049,216 B2 | 6/2015 | McCanne et al. |
| 9,083,740 B1 | 7/2015 | Ma et al. |
| 9,094,288 B1 | 7/2015 | Nucci et al. |
| 9,094,326 B2 | 7/2015 | Sundararajan et al. |
| 9,158,604 B1 | 10/2015 | Christodorescu et al. |
| 9,176,838 B2 | 11/2015 | Li et al. |
| 9,183,573 B2 | 11/2015 | Tseng |
| 9,189,318 B2 | 11/2015 | Li et al. |
| 9,191,400 B1 | 11/2015 | Ptasinski et al. |
| 9,203,865 B2 | 12/2015 | Linden et al. |
| 9,264,288 B1 | 2/2016 | Arora et al. |
| 9,338,147 B1 | 5/2016 | Rothstein et al. |
| 9,357,410 B2 | 5/2016 | Nedeltchev et al. |
| 9,369,479 B2 | 6/2016 | Lin |
| 9,380,489 B2 | 6/2016 | Kotecha et al. |
| 9,391,866 B1 | 7/2016 | Martin et al. |
| 9,400,871 B1 | 7/2016 | Hewinson |
| 9,401,925 B1 | 7/2016 | Guo et al. |
| 9,426,036 B1 | 8/2016 | Roy |
| 9,430,646 B1 | 8/2016 | Mushtaq et al. |
| 9,432,430 B1 | 8/2016 | Klenz |
| 9,460,299 B2 | 10/2016 | Weiss et al. |
| 9,461,875 B2 | 10/2016 | Groat et al. |
| 9,479,405 B1 | 10/2016 | Tongaonkar et al. |
| 9,483,742 B1 | 11/2016 | Ahmed |
| 9,516,053 B1 | 12/2016 | Muddu et al. |
| 9,531,736 B1 | 12/2016 | Torres et al. |
| 9,565,202 B1 | 2/2017 | Kindlund et al. |
| 9,565,203 B2 | 2/2017 | Bernstein et al. |
| 9,591,015 B1 | 3/2017 | Amin et al. |

(56) References Cited

U.S. PATENT DOCUMENTS

| | | |
|---|---|---|
| 9,621,523 B2 | 4/2017 | Rothstein et al. |
| 9,654,503 B1 | 5/2017 | Kowalyshyn |
| 9,660,879 B1 | 5/2017 | Rothstein et al. |
| 9,692,658 B2 | 6/2017 | Guo et al. |
| 9,715,820 B1 | 7/2017 | Boss et al. |
| 9,729,416 B1 | 8/2017 | Khanal et al. |
| 9,860,209 B2 | 1/2018 | Buchanan et al. |
| 9,876,810 B2 | 1/2018 | McDougal et al. |
| 9,888,021 B2 | 2/2018 | Horesh et al. |
| 9,893,897 B2 | 2/2018 | Li et al. |
| 9,967,292 B1 | 5/2018 | Higgins et al. |
| 10,009,364 B2 | 6/2018 | Dasgupta et al. |
| 10,009,793 B2 | 6/2018 | Wetterwald et al. |
| 10,027,689 B1 | 7/2018 | Rathor et al. |
| 10,028,167 B2 | 7/2018 | Calin et al. |
| 10,033,766 B2 | 7/2018 | Gupta et al. |
| 10,038,611 B1 | 7/2018 | Wu et al. |
| 10,050,982 B1 | 8/2018 | Guerra et al. |
| 10,063,434 B1 | 8/2018 | Khanal et al. |
| 10,122,748 B1 | 11/2018 | Currie |
| 10,176,323 B2 | 1/2019 | Zhang et al. |
| 10,198,667 B2 | 2/2019 | Ryan, Jr. et al. |
| 10,204,211 B2 | 2/2019 | Hammerle et al. |
| 10,237,294 B1 | 3/2019 | Zadeh et al. |
| 10,263,883 B2 | 4/2019 | Kamble |
| 10,264,003 B1 | 4/2019 | Wu et al. |
| 10,270,794 B1 | 4/2019 | Mukerji et al. |
| 10,277,618 B1 | 4/2019 | Wu et al. |
| 10,305,928 B2 | 5/2019 | McGrew et al. |
| 10,320,749 B2 | 6/2019 | Sengupta et al. |
| 10,321,344 B2 | 6/2019 | Barton et al. |
| 10,326,676 B1 | 6/2019 | Driggs et al. |
| 10,332,005 B1 | 6/2019 | Liao et al. |
| 10,348,767 B1 | 7/2019 | Lee et al. |
| 10,375,155 B1 | 8/2019 | Cai et al. |
| 10,380,498 B1 | 8/2019 | Chaoji et al. |
| 10,389,574 B1 | 8/2019 | Wu et al. |
| 10,411,978 B1 | 9/2019 | Ball et al. |
| 10,412,080 B1 | 9/2019 | Edwards et al. |
| 10,419,454 B2 | 9/2019 | El-Moussa et al. |
| 10,476,673 B2 | 11/2019 | Higgins et al. |
| 10,536,268 B2 | 1/2020 | Anderson et al. |
| 10,536,475 B1 | 1/2020 | McCorkle, Jr. et al. |
| 10,554,665 B1 | 2/2020 | Badawy et al. |
| 10,581,915 B2 | 3/2020 | Scherman et al. |
| 10,594,664 B2 | 3/2020 | Zaifman et al. |
| 10,594,718 B1 | 3/2020 | Deaguero et al. |
| 10,673,870 B2 | 6/2020 | Pierce |
| 10,728,126 B2 | 7/2020 | Wu et al. |
| 10,742,677 B1 | 8/2020 | Wu et al. |
| 10,778,700 B2 | 9/2020 | Azvine et al. |
| 10,783,262 B2 * | 9/2020 | Goyal ............... G06F 21/6218 |
| 10,805,338 B2 | 10/2020 | Kohout et al. |
| 10,841,194 B2 | 11/2020 | Kim et al. |
| 10,944,769 B2 | 3/2021 | Singh |
| 10,965,546 B2 | 3/2021 | Pignataro et al. |
| 10,979,446 B1 | 4/2021 | Stevens et al. |
| 10,984,122 B2 * | 4/2021 | Thomas ............... H04L 63/1425 |
| 10,992,693 B2 | 4/2021 | Luo et al. |
| 11,055,300 B2 | 7/2021 | Zhang et al. |
| 11,057,420 B2 | 7/2021 | McGrew et al. |
| 11,093,518 B1 | 8/2021 | Lu et al. |
| 11,106,442 B1 | 8/2021 | Hsiao et al. |
| 11,157,446 B1 | 10/2021 | Kuruvada et al. |
| 11,159,549 B2 | 10/2021 | El-Moussa et al. |
| 11,165,831 B2 | 11/2021 | Higgins et al. |
| 11,188,550 B2 | 11/2021 | Haggie et al. |
| 11,194,901 B2 | 12/2021 | El-Moussa et al. |
| 11,200,246 B2 | 12/2021 | Kharisma et al. |
| 11,201,876 B2 | 12/2021 | Kallos et al. |
| 11,310,256 B2 | 4/2022 | Higgins et al. |
| 11,388,072 B2 | 7/2022 | Wu et al. |
| 2001/0054157 A1 | 12/2001 | Fukumoto |
| 2002/0023080 A1 | 2/2002 | Uga et al. |
| 2002/0024964 A1 | 2/2002 | Baum et al. |
| 2002/0035604 A1 | 3/2002 | Cohen et al. |
| 2002/0055998 A1 | 5/2002 | Riddle et al. |
| 2002/0065912 A1 | 5/2002 | Catchpole et al. |
| 2002/0078382 A1 | 6/2002 | Sheikh et al. |
| 2002/0080720 A1 | 6/2002 | Pegrum et al. |
| 2002/0091844 A1 | 7/2002 | Craft et al. |
| 2002/0097724 A1 | 7/2002 | Halme et al. |
| 2002/0107953 A1 | 8/2002 | Ontiveros et al. |
| 2002/0133586 A1 | 9/2002 | Shanklin et al. |
| 2002/0133622 A1 | 9/2002 | Pinto |
| 2002/0152209 A1 | 10/2002 | Merugu et al. |
| 2002/0156880 A1 | 10/2002 | Mokuya |
| 2002/0175934 A1 | 11/2002 | Hand et al. |
| 2002/0178360 A1 | 11/2002 | Wenocur et al. |
| 2002/0184362 A1 | 12/2002 | Banerjee et al. |
| 2002/0194483 A1 | 12/2002 | Wenocur et al. |
| 2002/0194501 A1 | 12/2002 | Wenocur et al. |
| 2002/0199096 A1 | 12/2002 | Wenocur et al. |
| 2002/0199098 A1 | 12/2002 | Davis |
| 2003/0014628 A1 | 1/2003 | Freed et al. |
| 2003/0018891 A1 | 1/2003 | Hall et al. |
| 2003/0023733 A1 | 1/2003 | Lingafelt et al. |
| 2003/0084279 A1 | 5/2003 | Campagna |
| 2003/0093514 A1 | 5/2003 | Valdes et al. |
| 2003/0131116 A1 | 7/2003 | Jain et al. |
| 2003/0133443 A1 | 7/2003 | Klinker et al. |
| 2003/0135667 A1 | 7/2003 | Mann et al. |
| 2003/0145225 A1 | 7/2003 | Bruton, III et al. |
| 2003/0149887 A1 | 8/2003 | Yadav |
| 2003/0152094 A1 | 8/2003 | Colavito et al. |
| 2003/0156715 A1 | 8/2003 | Reeds, III et al. |
| 2003/0204621 A1 | 10/2003 | Poletto et al. |
| 2003/0212900 A1 | 11/2003 | Liu et al. |
| 2003/0214913 A1 | 11/2003 | Kan et al. |
| 2003/0217144 A1 | 11/2003 | Fu et al. |
| 2003/0233361 A1 | 12/2003 | Cady |
| 2004/0003094 A1 | 1/2004 | See |
| 2004/0047325 A1 | 3/2004 | Hameleers et al. |
| 2004/0049699 A1 | 3/2004 | Griffith et al. |
| 2004/0073512 A1 | 4/2004 | Maung |
| 2004/0088544 A1 | 5/2004 | Tariq et al. |
| 2004/0088557 A1 | 5/2004 | Malcolm et al. |
| 2004/0093414 A1 | 5/2004 | Orton |
| 2004/0093513 A1 | 5/2004 | Cantrell et al. |
| 2004/0146006 A1 | 7/2004 | Jackson |
| 2004/0162070 A1 | 8/2004 | Baral et al. |
| 2004/0199630 A1 | 10/2004 | Sarkissian et al. |
| 2004/0250059 A1 | 12/2004 | Ramelson et al. |
| 2005/0015455 A1 | 1/2005 | Liu |
| 2005/0015622 A1 | 1/2005 | Williams et al. |
| 2005/0050316 A1 | 3/2005 | Peles |
| 2005/0055578 A1 | 3/2005 | Wright et al. |
| 2005/0060427 A1 | 3/2005 | Phillips et al. |
| 2005/0066196 A1 | 3/2005 | Yagi |
| 2005/0086255 A1 | 4/2005 | Schran et al. |
| 2005/0091341 A1 | 4/2005 | Knight et al. |
| 2005/0091357 A1 | 4/2005 | Krantz et al. |
| 2005/0100000 A1 | 5/2005 | Faulkner et al. |
| 2005/0111367 A1 | 5/2005 | Jonathan Chao et al. |
| 2005/0125553 A1 | 6/2005 | Wu et al. |
| 2005/0125684 A1 | 6/2005 | Schmidt |
| 2005/0182833 A1 | 8/2005 | Duffie, III et al. |
| 2005/0193245 A1 | 9/2005 | Hayden et al. |
| 2005/0201363 A1 | 9/2005 | Gilchrist et al. |
| 2005/0210242 A1 | 9/2005 | Troxel et al. |
| 2005/0234920 A1 | 10/2005 | Rhodes |
| 2005/0251009 A1 | 11/2005 | Morita et al. |
| 2005/0262237 A1 | 11/2005 | Fulton et al. |
| 2005/0270975 A1 | 12/2005 | Meylan et al. |
| 2006/0029096 A1 | 2/2006 | Babbar et al. |
| 2006/0045016 A1 | 3/2006 | Dawdy et al. |
| 2006/0045017 A1 | 3/2006 | Yamasaki |
| 2006/0075358 A1 | 4/2006 | Ahokas |
| 2006/0085526 A1 | 4/2006 | Gulland |
| 2006/0101068 A1 | 5/2006 | Stuhec et al. |
| 2006/0106743 A1 | 5/2006 | Horvitz |
| 2006/0114832 A1 | 6/2006 | Hamilton et al. |
| 2006/0123477 A1 | 6/2006 | Raghavan et al. |
| 2006/0171333 A1 | 8/2006 | Shimada et al. |

(56) References Cited

U.S. PATENT DOCUMENTS

| | | |
|---|---|---|
| 2006/0174343 A1 | 8/2006 | Duthie et al. |
| 2006/0184535 A1 | 8/2006 | Kaluskar et al. |
| 2006/0188494 A1 | 8/2006 | Bach et al. |
| 2006/0191008 A1 | 8/2006 | Fernando et al. |
| 2006/0191009 A1 | 8/2006 | Ito et al. |
| 2006/0200572 A1 | 9/2006 | Schcolnik |
| 2006/0230452 A1 | 10/2006 | Field |
| 2006/0230456 A1 | 10/2006 | Nagabhushan et al. |
| 2006/0233349 A1 | 10/2006 | Cooper |
| 2007/0039051 A1 | 2/2007 | Duthie et al. |
| 2007/0043861 A1 | 2/2007 | Baron et al. |
| 2007/0067841 A1 | 3/2007 | Yegneswaran et al. |
| 2007/0077931 A1 | 4/2007 | Glinka |
| 2007/0088845 A1 | 4/2007 | Memon et al. |
| 2007/0110053 A1 | 5/2007 | Soni et al. |
| 2007/0143852 A1 | 6/2007 | Keanini et al. |
| 2007/0153689 A1 | 7/2007 | Strub et al. |
| 2007/0156886 A1 | 7/2007 | Srivastava |
| 2007/0156919 A1 | 7/2007 | Potti et al. |
| 2007/0157306 A1 | 7/2007 | Elrod et al. |
| 2007/0169190 A1 | 7/2007 | Kolton et al. |
| 2007/0188494 A1 | 8/2007 | Agutter et al. |
| 2007/0192863 A1 | 8/2007 | Kapoor et al. |
| 2007/0211625 A1 | 9/2007 | Liu et al. |
| 2007/0239639 A1 | 10/2007 | Loughmiller et al. |
| 2007/0245420 A1 | 10/2007 | Yong et al. |
| 2007/0256122 A1 | 11/2007 | Foo et al. |
| 2007/0271592 A1* | 11/2007 | Noda .............. H04L 9/3234 726/1 |
| 2008/0019275 A1 | 1/2008 | Mudireddy et al. |
| 2008/0022401 A1 | 1/2008 | Cameron et al. |
| 2008/0031141 A1 | 2/2008 | Lean et al. |
| 2008/0034424 A1 | 2/2008 | Overcash et al. |
| 2008/0034425 A1 | 2/2008 | Overcash et al. |
| 2008/0059582 A1 | 3/2008 | Hartikainen et al. |
| 2008/0062995 A1 | 3/2008 | Kaas et al. |
| 2008/0069002 A1 | 3/2008 | Savoor et al. |
| 2008/0103610 A1 | 5/2008 | Ebrom et al. |
| 2008/0130645 A1 | 6/2008 | Deshpande et al. |
| 2008/0130659 A1 | 6/2008 | Polland |
| 2008/0133517 A1 | 6/2008 | Kapoor et al. |
| 2008/0133518 A1 | 6/2008 | Kapoor et al. |
| 2008/0134330 A1 | 6/2008 | Kapoor et al. |
| 2008/0141275 A1 | 6/2008 | Borgendale et al. |
| 2008/0141374 A1 | 6/2008 | Sidiroglou et al. |
| 2008/0147818 A1 | 6/2008 | Sabo |
| 2008/0162390 A1 | 7/2008 | Kapoor et al. |
| 2008/0172416 A1 | 7/2008 | Ito |
| 2008/0212586 A1 | 9/2008 | Wang et al. |
| 2008/0219261 A1 | 9/2008 | Lin et al. |
| 2008/0222717 A1 | 9/2008 | Rothstein et al. |
| 2008/0225740 A1 | 9/2008 | Martin et al. |
| 2008/0232359 A1 | 9/2008 | Kim et al. |
| 2008/0279111 A1 | 11/2008 | Atkins et al. |
| 2008/0282080 A1 | 11/2008 | Hyndman et al. |
| 2008/0294384 A1 | 11/2008 | Fok et al. |
| 2008/0307219 A1 | 12/2008 | Karandikar |
| 2008/0320297 A1 | 12/2008 | Sabo et al. |
| 2009/0010259 A1 | 1/2009 | Sirotkin |
| 2009/0034426 A1 | 2/2009 | Luft et al. |
| 2009/0063665 A1 | 3/2009 | Bagepalli et al. |
| 2009/0089326 A1 | 4/2009 | Balasubramanian |
| 2009/0109973 A1 | 4/2009 | Ilnicki |
| 2009/0168657 A1 | 7/2009 | Puri et al. |
| 2009/0187653 A1 | 7/2009 | Fu et al. |
| 2009/0204723 A1 | 8/2009 | Tonsing et al. |
| 2009/0220080 A1 | 9/2009 | Herne et al. |
| 2009/0225675 A1 | 9/2009 | Baum et al. |
| 2009/0228330 A1 | 9/2009 | Karras et al. |
| 2009/0245083 A1 | 10/2009 | Hamzeh |
| 2009/0265344 A1* | 10/2009 | Etoh .............. G06F 16/951 707/999.005 |
| 2009/0268605 A1 | 10/2009 | Campbell et al. |
| 2009/0271469 A1 | 10/2009 | Benco et al. |
| 2009/0292954 A1 | 11/2009 | Jiang et al. |
| 2009/0296593 A1 | 12/2009 | Prescott |
| 2009/0316602 A1 | 12/2009 | Nandy et al. |
| 2009/0319773 A1 | 12/2009 | Frenkel et al. |
| 2009/0320138 A1 | 12/2009 | Keanini et al. |
| 2009/0327695 A1 | 12/2009 | Molsberry et al. |
| 2009/0328219 A1 | 12/2009 | Narayanaswamy |
| 2010/0027432 A1 | 2/2010 | Gopalan et al. |
| 2010/0091770 A1 | 4/2010 | Ishikawa |
| 2010/0095367 A1 | 4/2010 | Narayanaswamy |
| 2010/0131755 A1 | 5/2010 | Zhu et al. |
| 2010/0135498 A1 | 6/2010 | Long et al. |
| 2010/0167713 A1 | 7/2010 | Hoffman |
| 2010/0191856 A1 | 7/2010 | Gupta et al. |
| 2010/0192225 A1 | 7/2010 | Ma et al. |
| 2010/0201573 A1 | 8/2010 | Lamming |
| 2010/0226301 A1 | 9/2010 | Lohmar et al. |
| 2010/0250918 A1 | 9/2010 | Tremblay et al. |
| 2010/0250928 A1 | 9/2010 | Goto |
| 2010/0268937 A1 | 10/2010 | Blom et al. |
| 2010/0278056 A1 | 11/2010 | Meloche et al. |
| 2010/0281539 A1 | 11/2010 | Burns et al. |
| 2010/0299158 A1 | 11/2010 | Siegel |
| 2010/0316216 A1 | 12/2010 | Fukushima et al. |
| 2010/0322248 A1 | 12/2010 | Ivanov |
| 2010/0332618 A1 | 12/2010 | Norton et al. |
| 2011/0019574 A1 | 1/2011 | Malomsoky et al. |
| 2011/0055138 A1 | 3/2011 | Khanduja et al. |
| 2011/0122792 A1 | 5/2011 | Duffield et al. |
| 2011/0126259 A1 | 5/2011 | Krishnamurthi et al. |
| 2011/0126275 A1 | 5/2011 | Anderson et al. |
| 2011/0150220 A1 | 6/2011 | Breton et al. |
| 2011/0173441 A1 | 7/2011 | Bagepalli et al. |
| 2011/0173490 A1 | 7/2011 | Narayanaswamy et al. |
| 2011/0197276 A1 | 8/2011 | Dorrendorf et al. |
| 2011/0231652 A1 | 9/2011 | Bollay et al. |
| 2011/0280149 A1 | 11/2011 | Okada et al. |
| 2011/0296002 A1 | 12/2011 | Caram |
| 2011/0320394 A1 | 12/2011 | McKeown et al. |
| 2011/0321160 A1 | 12/2011 | Mohandas et al. |
| 2012/0016977 A1 | 1/2012 | Robertson et al. |
| 2012/0030731 A1 | 2/2012 | Bhargava et al. |
| 2012/0084838 A1 | 4/2012 | Inforzato et al. |
| 2012/0130745 A1 | 5/2012 | Jones |
| 2012/0131330 A1 | 5/2012 | Tönsing et al. |
| 2012/0166962 A1 | 6/2012 | Lunsford |
| 2012/0176917 A1 | 7/2012 | Matityahu et al. |
| 2012/0210385 A1 | 8/2012 | Cirstea et al. |
| 2012/0215328 A1 | 8/2012 | Schmelzer |
| 2012/0216282 A1 | 8/2012 | Pappu et al. |
| 2012/0233694 A1 | 9/2012 | Baliga et al. |
| 2012/0243533 A1 | 9/2012 | Leong |
| 2012/0266209 A1 | 10/2012 | Gooding et al. |
| 2012/0278477 A1 | 11/2012 | Terrell et al. |
| 2012/0278625 A1 | 11/2012 | Narayanan et al. |
| 2012/0278890 A1 | 11/2012 | Määttä et al. |
| 2012/0284791 A1 | 11/2012 | Miller et al. |
| 2012/0290711 A1 | 11/2012 | Upham et al. |
| 2012/0294305 A1 | 11/2012 | Rose et al. |
| 2012/0324585 A1 | 12/2012 | Beckett, III et al. |
| 2013/0007296 A1 | 1/2013 | Mukherjee et al. |
| 2013/0010600 A1 | 1/2013 | Jocha et al. |
| 2013/0010608 A1 | 1/2013 | Ramachandran et al. |
| 2013/0041896 A1* | 2/2013 | Ghani .............. G06F 16/3328 707/E17.014 |
| 2013/0042323 A1 | 2/2013 | Narayanaswamy et al. |
| 2013/0061036 A1 | 3/2013 | Oliver |
| 2013/0064084 A1 | 3/2013 | Babbar et al. |
| 2013/0067034 A1 | 3/2013 | Degioanni et al. |
| 2013/0097203 A1 | 4/2013 | Bhattacharjee et al. |
| 2013/0103734 A1 | 4/2013 | Boldyrev et al. |
| 2013/0111543 A1 | 5/2013 | Brown et al. |
| 2013/0133032 A1 | 5/2013 | Li et al. |
| 2013/0166730 A1 | 6/2013 | Wilkinson |
| 2013/0176842 A1 | 7/2013 | Bauchot et al. |
| 2013/0188645 A1 | 7/2013 | Mack-Crane |
| 2013/0198512 A1 | 8/2013 | Rubin et al. |
| 2013/0198827 A1 | 8/2013 | Bhaskaran et al. |
| 2013/0212297 A1 | 8/2013 | Varga |
| 2013/0227259 A1 | 8/2013 | Kim |

(56) References Cited

U.S. PATENT DOCUMENTS

| | | |
|---|---|---|
| 2013/0232104 A1 | 9/2013 | Goyal et al. |
| 2013/0262655 A1 | 10/2013 | Deschênes et al. |
| 2013/0291107 A1 | 10/2013 | Marck et al. |
| 2013/0305357 A1 | 11/2013 | Ayyagari et al. |
| 2013/0305392 A1 | 11/2013 | Bar-El et al. |
| 2013/0339514 A1 | 12/2013 | Crank et al. |
| 2013/0347018 A1 | 12/2013 | Limp et al. |
| 2014/0007222 A1* | 1/2014 | Qureshi .................. H04L 67/10 726/16 |
| 2014/0020067 A1 | 1/2014 | Kim et al. |
| 2014/0026193 A1 | 1/2014 | Saxman et al. |
| 2014/0040451 A1 | 2/2014 | Agrawal et al. |
| 2014/0068035 A1 | 3/2014 | Croy et al. |
| 2014/0075536 A1 | 3/2014 | Davis et al. |
| 2014/0077956 A1 | 3/2014 | Sampath et al. |
| 2014/0109168 A1 | 4/2014 | Ashley et al. |
| 2014/0149456 A1 | 5/2014 | Carr et al. |
| 2014/0164584 A1 | 6/2014 | Joe et al. |
| 2014/0165207 A1 | 6/2014 | Engel et al. |
| 2014/0189093 A1 | 7/2014 | du Toit et al. |
| 2014/0195797 A1 | 7/2014 | du Toit |
| 2014/0201838 A1 | 7/2014 | Varsanyi et al. |
| 2014/0222998 A1 | 8/2014 | Vasseur et al. |
| 2014/0223325 A1 | 8/2014 | Melendez et al. |
| 2014/0241164 A1 | 8/2014 | Cociglio et al. |
| 2014/0242972 A1 | 8/2014 | Slotznick |
| 2014/0258511 A1 | 9/2014 | Sima et al. |
| 2014/0269777 A1 | 9/2014 | Rothstein et al. |
| 2014/0304211 A1 | 10/2014 | Horvitz |
| 2014/0304339 A1 | 10/2014 | Hamilton |
| 2014/0310392 A1 | 10/2014 | Ho |
| 2014/0317288 A1 | 10/2014 | Krueger et al. |
| 2014/0344633 A1 | 11/2014 | Li et al. |
| 2014/0351415 A1 | 11/2014 | Harrigan et al. |
| 2015/0006896 A1 | 1/2015 | Franck |
| 2015/0007314 A1 | 1/2015 | Vaughan |
| 2015/0007316 A1 | 1/2015 | Ben-Shalom et al. |
| 2015/0023168 A1 | 1/2015 | Kotecha et al. |
| 2015/0026027 A1 | 1/2015 | Priess et al. |
| 2015/0058987 A1 | 2/2015 | Thure et al. |
| 2015/0063158 A1 | 3/2015 | Nedeltchev et al. |
| 2015/0074258 A1 | 3/2015 | Ferreira et al. |
| 2015/0074462 A1 | 3/2015 | Jacoby |
| 2015/0089034 A1 | 3/2015 | Stickle et al. |
| 2015/0096022 A1 | 4/2015 | Vincent et al. |
| 2015/0100780 A1 | 4/2015 | Rubin et al. |
| 2015/0106616 A1 | 4/2015 | Nix |
| 2015/0106930 A1 | 4/2015 | Honda et al. |
| 2015/0113588 A1 | 4/2015 | Wing et al. |
| 2015/0121461 A1 | 4/2015 | Dulkin et al. |
| 2015/0134554 A1 | 5/2015 | Clais et al. |
| 2015/0134776 A1 | 5/2015 | Kruglick |
| 2015/0149828 A1 | 5/2015 | Mukerji et al. |
| 2015/0180759 A1 | 6/2015 | Fallon |
| 2015/0180890 A1 | 6/2015 | Ronen et al. |
| 2015/0188702 A1 | 7/2015 | Men et al. |
| 2015/0199613 A1 | 7/2015 | Ruiz et al. |
| 2015/0227859 A1 | 8/2015 | Ames, II |
| 2015/0229661 A1 | 8/2015 | Balabine et al. |
| 2015/0242627 A1 | 8/2015 | Lee et al. |
| 2015/0249512 A1 | 9/2015 | Adimatyam et al. |
| 2015/0269358 A1 | 9/2015 | Hesketh et al. |
| 2015/0277802 A1 | 10/2015 | Oikarinen et al. |
| 2015/0304350 A1 | 10/2015 | Lin |
| 2015/0331771 A1 | 11/2015 | Conway |
| 2015/0341379 A1 | 11/2015 | Lefebvre et al. |
| 2015/0350167 A1 | 12/2015 | Djakovic |
| 2015/0365438 A1 | 12/2015 | Carver et al. |
| 2016/0006766 A1 | 1/2016 | Joo |
| 2016/0026922 A1 | 1/2016 | Vasseur et al. |
| 2016/0028755 A1 | 1/2016 | Vasseur et al. |
| 2016/0036647 A1 | 2/2016 | Gonzalez et al. |
| 2016/0043919 A1 | 2/2016 | Connelly et al. |
| 2016/0055335 A1 | 2/2016 | Herwono et al. |
| 2016/0056959 A1 | 2/2016 | Blom et al. |
| 2016/0080236 A1 | 3/2016 | Nikolaev et al. |
| 2016/0093205 A1 | 3/2016 | Boyer |
| 2016/0119215 A1 | 4/2016 | Deschênes et al. |
| 2016/0127401 A1 | 5/2016 | Chauhan et al. |
| 2016/0134659 A1 | 5/2016 | Reddy et al. |
| 2016/0142435 A1 | 5/2016 | Bernstein et al. |
| 2016/0173288 A1 | 6/2016 | Li et al. |
| 2016/0173556 A1 | 6/2016 | Park et al. |
| 2016/0182274 A1 | 6/2016 | Kiesekamp et al. |
| 2016/0197949 A1 | 7/2016 | Nyhuis et al. |
| 2016/0219066 A1 | 7/2016 | Vasseur et al. |
| 2016/0226913 A1 | 8/2016 | Sood et al. |
| 2016/0241574 A1 | 8/2016 | Kumar et al. |
| 2016/0262044 A1 | 9/2016 | Calin et al. |
| 2016/0285752 A1 | 9/2016 | Joshi |
| 2016/0294870 A1 | 10/2016 | Banerjee et al. |
| 2016/0301624 A1 | 10/2016 | Gonzalez et al. |
| 2016/0301709 A1 | 10/2016 | Hassanzadeh et al. |
| 2016/0308725 A1 | 10/2016 | Tang et al. |
| 2016/0337312 A1 | 11/2016 | Buchanan et al. |
| 2016/0352761 A1 | 12/2016 | McGrew et al. |
| 2016/0357964 A1 | 12/2016 | Mulchandani |
| 2016/0357967 A1 | 12/2016 | Mulchandani |
| 2016/0359872 A1 | 12/2016 | Yadav et al. |
| 2016/0359915 A1 | 12/2016 | Gupta et al. |
| 2016/0366020 A1 | 12/2016 | Ramachandran et al. |
| 2016/0366186 A1 | 12/2016 | Kamble |
| 2016/0373414 A1 | 12/2016 | MacCarthaigh |
| 2016/0380885 A1 | 12/2016 | Jani et al. |
| 2017/0012836 A1 | 1/2017 | Tongaonkar et al. |
| 2017/0041296 A1 | 2/2017 | Ford et al. |
| 2017/0048109 A1 | 2/2017 | Kant et al. |
| 2017/0070416 A1 | 3/2017 | Narayanan et al. |
| 2017/0076206 A1 | 3/2017 | Lastras-Montano et al. |
| 2017/0085459 A1 | 3/2017 | Xia et al. |
| 2017/0085590 A1 | 3/2017 | Hsu et al. |
| 2017/0090906 A1 | 3/2017 | Reynolds |
| 2017/0093796 A1 | 3/2017 | Wang et al. |
| 2017/0093891 A1 | 3/2017 | Mitchell |
| 2017/0093897 A1 | 3/2017 | Cochin et al. |
| 2017/0097982 A1 | 4/2017 | Zhang et al. |
| 2017/0099196 A1 | 4/2017 | Barsheshet et al. |
| 2017/0111272 A1 | 4/2017 | Liu et al. |
| 2017/0118092 A1 | 4/2017 | Dixon et al. |
| 2017/0123886 A1 | 5/2017 | Vaideeswaran |
| 2017/0126472 A1 | 5/2017 | Margalit et al. |
| 2017/0126709 A1 | 5/2017 | Baradaran et al. |
| 2017/0134937 A1 | 5/2017 | Miller et al. |
| 2017/0195353 A1 | 7/2017 | Taylor et al. |
| 2017/0230270 A1 | 8/2017 | Padinhakara et al. |
| 2017/0230417 A1 | 8/2017 | Amar et al. |
| 2017/0270105 A1 | 9/2017 | Ninan et al. |
| 2017/0279837 A1 | 9/2017 | Dasgupta et al. |
| 2017/0279838 A1 | 9/2017 | Dasgupta et al. |
| 2017/0279839 A1 | 9/2017 | Vasseur et al. |
| 2017/0288974 A1 | 10/2017 | Yoshihira et al. |
| 2017/0288987 A1 | 10/2017 | Pasupathy et al. |
| 2017/0289104 A1 | 10/2017 | Shankar et al. |
| 2017/0289168 A1 | 10/2017 | Bar et al. |
| 2017/0289185 A1 | 10/2017 | Mandyam |
| 2017/0289847 A1 | 10/2017 | Wetterwald et al. |
| 2017/0310703 A1 | 10/2017 | Ackerman et al. |
| 2017/0317941 A1 | 11/2017 | Eggleston et al. |
| 2017/0324758 A1 | 11/2017 | Hart et al. |
| 2017/0353437 A1 | 12/2017 | Ayyadevara et al. |
| 2017/0353477 A1 | 12/2017 | Faigon et al. |
| 2017/0364794 A1 | 12/2017 | Mahkonen et al. |
| 2017/0366526 A1 | 12/2017 | Wood et al. |
| 2018/0004972 A1* | 1/2018 | Ruggiero .............. H04L 63/107 |
| 2018/0007087 A1 | 1/2018 | Grady et al. |
| 2018/0013650 A1 | 1/2018 | Khanal et al. |
| 2018/0033089 A1 | 2/2018 | Goldman et al. |
| 2018/0075240 A1 | 3/2018 | Chen |
| 2018/0084011 A1 | 3/2018 | Joseph et al. |
| 2018/0089286 A1 | 3/2018 | Marquardt et al. |
| 2018/0091413 A1 | 3/2018 | Richards et al. |
| 2018/0091534 A1 | 3/2018 | Dubrovsky et al. |
| 2018/0103056 A1 | 4/2018 | Kohout et al. |
| 2018/0109507 A1 | 4/2018 | Caldera et al. |

(56) References Cited

U.S. PATENT DOCUMENTS

| | | |
|---|---|---|
| 2018/0109557 A1 | 4/2018 | Yoo et al. |
| 2018/0115566 A1 | 4/2018 | Azvine et al. |
| 2018/0131675 A1 | 5/2018 | Sengupta et al. |
| 2018/0131711 A1 | 5/2018 | Chen et al. |
| 2018/0137001 A1 | 5/2018 | Zong et al. |
| 2018/0139227 A1 | 5/2018 | Martin et al. |
| 2018/0167310 A1 | 6/2018 | Kamble |
| 2018/0191755 A1 | 7/2018 | Monaco et al. |
| 2018/0198812 A1 | 7/2018 | Christodorescu et al. |
| 2018/0219879 A1 | 8/2018 | Pierce |
| 2018/0260715 A1 | 9/2018 | Yan et al. |
| 2018/0262487 A1 | 9/2018 | Zaifman et al. |
| 2018/0276561 A1 | 9/2018 | Pasternack et al. |
| 2018/0351781 A1 | 12/2018 | Movsisyan et al. |
| 2018/0351970 A1 | 12/2018 | Majumder et al. |
| 2018/0375882 A1 | 12/2018 | Kallos et al. |
| 2018/0375893 A1 | 12/2018 | Jordan et al. |
| 2019/0005205 A1 | 1/2019 | Dargar et al. |
| 2019/0007283 A1 | 1/2019 | Kieviet et al. |
| 2019/0012441 A1 | 1/2019 | Tuli et al. |
| 2019/0028357 A1 | 1/2019 | Kokkula et al. |
| 2019/0052554 A1 | 2/2019 | Mukerji et al. |
| 2019/0052675 A1 | 2/2019 | Krebs |
| 2019/0068465 A1 | 2/2019 | Khanal et al. |
| 2019/0079979 A1 | 3/2019 | Chan |
| 2019/0095478 A1 | 3/2019 | Tankersley et al. |
| 2019/0102469 A1 | 4/2019 | Makovsky et al. |
| 2019/0121979 A1 | 4/2019 | Chari et al. |
| 2019/0132359 A1 | 5/2019 | Kraenzel et al. |
| 2019/0163678 A1 | 5/2019 | Bath et al. |
| 2019/0171725 A1 | 6/2019 | Shen et al. |
| 2019/0196912 A1 | 6/2019 | Didehban et al. |
| 2019/0230095 A1 | 7/2019 | McGrew et al. |
| 2019/0236149 A1 | 8/2019 | Kuruvada et al. |
| 2019/0245734 A1 | 8/2019 | Wu et al. |
| 2019/0245759 A1 | 8/2019 | Mukerji et al. |
| 2019/0245763 A1 | 8/2019 | Wu et al. |
| 2019/0266999 A1 | 8/2019 | Chandrasekaran et al. |
| 2019/0303198 A1 | 10/2019 | Kim et al. |
| 2019/0318109 A1* | 10/2019 | Thomas ............... H04L 9/3213 |
| 2019/0340554 A1 | 11/2019 | Dotan-Cohen et al. |
| 2019/0372828 A1 | 12/2019 | Wu et al. |
| 2019/0372864 A1 | 12/2019 | Pignataro et al. |
| 2019/0387005 A1 | 12/2019 | Zawoad et al. |
| 2020/0034528 A1 | 1/2020 | Yang et al. |
| 2020/0067952 A1 | 2/2020 | Deaguero et al. |
| 2020/0082081 A1* | 3/2020 | Sarin ..................... H04W 12/08 |
| 2020/0099703 A1 | 3/2020 | Singh |
| 2020/0167349 A1 | 5/2020 | Marquardt et al. |
| 2020/0201850 A1 | 6/2020 | Haggie et al. |
| 2020/0220849 A1 | 7/2020 | Zaifman et al. |
| 2020/0236131 A1 | 7/2020 | Vejman et al. |
| 2020/0287885 A1 | 9/2020 | Rodniansky |
| 2020/0287927 A1 | 9/2020 | Zadeh et al. |
| 2020/0321087 A1* | 10/2020 | Willis ..................... G16H 70/00 |
| 2020/0366691 A1 | 11/2020 | Pierce |
| 2020/0389469 A1 | 12/2020 | Litichever et al. |
| 2021/0006589 A1 | 1/2021 | Kohout et al. |
| 2021/0012020 A1* | 1/2021 | Malton ............... G06F 16/2379 |
| 2021/0185087 A1 | 6/2021 | Wu et al. |
| 2021/0218714 A1 | 7/2021 | Wang et al. |
| 2021/0250368 A1 | 8/2021 | Hearty et al. |
| 2021/0288993 A1 | 9/2021 | Kraning et al. |
| 2021/0342337 A1 | 11/2021 | Lu et al. |
| 2021/0350276 A1* | 11/2021 | Ashlock ................ G06F 18/217 |
| 2021/0360004 A1 | 11/2021 | McGrew et al. |
| 2021/0360011 A1 | 11/2021 | O'Hara et al. |
| 2022/0019688 A1* | 1/2022 | Nelluri ................... G06N 20/00 |
| 2022/0067177 A1* | 3/2022 | Chugunov .......... G06F 16/1734 |
| 2022/0070188 A1 | 3/2022 | Sheedy et al. |
| 2022/0224716 A1 | 7/2022 | Salji |

FOREIGN PATENT DOCUMENTS

| | | |
|---|---|---|
| CN | 105071987 A | 11/2015 |
| CN | 105323247 A | 2/2016 |
| CN | 106170008 A | 11/2016 |
| CN | 106341375 A | 1/2017 |
| CN | 107646190 A | 1/2018 |
| CN | 107667510 A | 2/2018 |
| CN | 106533665 B | 8/2018 |
| CN | 109104441 A | 12/2018 |
| CN | 109542772 A1 | 3/2019 |
| CN | 110113349 A | 8/2019 |
| CN | 107667510 B | 11/2020 |
| CN | 112085039 A | 12/2020 |
| CN | 112398876 A | 2/2021 |
| CN | 107646190 B | 3/2021 |
| DE | 69533953 T2 | 4/2006 |
| EP | 0702477 A2 | 3/1996 |
| EP | 0702477 A3 | 7/1999 |
| EP | 1026867 A2 | 8/2000 |
| EP | 0702477 B1 | 1/2005 |
| EP | 1579629 A2 | 9/2005 |
| EP | 2057576 A2 | 5/2009 |
| EP | 1579629 A4 | 11/2009 |
| EP | 2215801 B1 | 4/2011 |
| EP | 2057576 A4 | 4/2012 |
| EP | 3089424 A1 | 11/2016 |
| EP | 3094061 A1 | 11/2016 |
| EP | 3113443 A1 | 1/2017 |
| EP | 3306890 A1 | 4/2018 |
| EP | 3394784 B1 | 10/2020 |
| EP | 3272095 B1 | 3/2021 |
| FR | 2924552 A1 | 6/2009 |
| GB | 2545910 A | 7/2017 |
| GB | 2545910 B | 2/2018 |
| KR | 960012819 A | 4/1996 |
| KR | 100388606 B1 | 11/2003 |
| KR | 20140093060 A | 7/2014 |
| KR | 101662614 B1 | 10/2016 |
| NZ | 586270 A | 12/2011 |
| WO | 2004040423 A2 | 5/2004 |
| WO | 2004040423 A3 | 5/2004 |
| WO | 2008026212 A2 | 3/2008 |
| WO | 2008026212 A3 | 3/2008 |
| WO | 2009015461 A1 | 2/2009 |
| WO | 2009068603 A2 | 6/2009 |
| WO | 2015128613 A1 | 9/2015 |
| WO | 2016118131 A1 | 7/2016 |
| WO | 2016144932 A1 | 9/2016 |
| WO | 2016146610 A1 | 9/2016 |
| WO | 2016191486 A1 | 12/2016 |
| WO | 2017108575 A1 | 6/2017 |
| WO | 2017108576 A1 | 6/2017 |
| WO | 2020131740 A1 | 6/2020 |

OTHER PUBLICATIONS

Office Communication for U.S. Appl. No. 13/831,673 dated Mar. 6, 2014, pp. 1-12.
Office Communication for U.S. Appl. No. 13/831,673 dated May 22, 2014, pp. 1-5.
Office Communication for U.S. Appl. No. 13/831,626 dated Sep. 3, 2013, pp. 1-17.
Office Communication for U.S. Appl. No. 13/831,959 dated Aug. 22, 2013, pp. 1-9.
Office Communication for U.S. Appl. No. 14/500,893 dated Nov. 20, 2014, pp. 1-15.
Office Communication for U.S. Appl. No. 14/107,580 dated Mar. 6, 2014, pp. 1-13.
Office Communication for U.S. Appl. No. 14/107,580 dated Sep. 15, 2014, pp. 1-15.
Office Communication for U.S. Appl. No. 13/831,908 dated Aug. 9, 2013, pp. 1-29.
Office Communication for U.S. Appl. No. 13/831,908 dated Jan. 13, 2014, pp. 1-31.
Office Communication for U.S. Appl. No. 13/831,908 dated Apr. 9, 2014, pp. 1-3.

(56) References Cited

OTHER PUBLICATIONS

Office Communication for U.S. Appl. No. 13/831,908 dated Jun. 25, 2014, pp. 1-15.
Office Communication for U.S. Appl. No. 14/518,996 dated Nov. 20, 2014, pp. 1-41.
Office Communication for U.S. Appl. No. 14/107,631 dated Feb. 20, 2014, pp. 1-16.
Office Communication for U.S. Appl. No. 14/107,631 dated Sep. 26, 2014, pp. 1-14.
Office Communication for U.S. Appl. No. 14/107,631 dated Dec. 30, 2014, pp. 1-12.
Office Communication for U.S. Appl. No. 14/107,580 dated Mar. 17, 2015, pp. 1-5.
U.S. Appl. No. 11/683,643, filed Mar. 8, 2007, pp. 1-48.
U.S. Appl. No. 11/679,356, filed Feb. 27, 2007, pp. 1-45.
Office Communication for U.S. Appl. No. 12/326,672 dated Jun. 9, 2010, pp. 1-9.
Office Communication for U.S. Appl. No. 12/326,672 dated Dec. 23, 2010, pp. 1-15.
Office Communication for U.S. Appl. No. 12/326,672 dated Jun. 22, 2011, pp. 1-16.
Office Communication for U.S. Appl. No. 12/326,672 dated Oct. 24, 2011, pp. 1-9.
Office Communication for U.S. Appl. No. 11/683,643 dated Apr. 28, 2010, pp. 1-35.
Office Communication for U.S. Appl. No. 11/683,643 dated Oct. 14, 2010, pp. 1-43.
Office Communication for U.S. Appl. No. 11/683,643 dated Aug. 25, 2011, pp. 1-43.
Office Communication for U.S. Appl. No. 11/683,643 dated Jan. 23, 2012, pp. 1-22.
Office Communication for U.S. Appl. No. 15/014,932 dated Jun. 10, 2016, pp. 1-20.
Office Communication for U.S. Appl. No. 15/207,213 dated Oct. 25, 2016, pp. 1-18.
Office Communication for U.S. Appl. No. 15/014,932 dated Dec. 14, 2016, pp. 1-26.
Office Communication for U.S. Appl. No. 15/207,213 dated Feb. 23, 2017, pp. 1-24.
Office Communication for U.S. Appl. No. 15/014,932 dated Mar. 3, 2017, pp. 1-6.
Office Communication for U.S. Appl. No. 15/207,213 dated May 8, 2017, pp. 1-6.
Office Communication for U.S. Appl. No. 15/207,213 dated Jun. 1, 2017, pp. 1-24.
Office Communication for U.S. Appl. No. 15/014,932 dated Aug. 1, 2017, pp. 1-27.
Office Communication for U.S. Appl. No. 15/690,135 dated Jan. 18, 2018, pp. 1-6.
Office Communication for U.S. Appl. No. 15/891,311 dated Apr. 23, 2018, pp. 1-18.
Office Communication for U.S. Appl. No. 15/892,327 dated Apr. 23, 2018, pp. 1-6.
Office Communication for U.S. Appl. No. 15/014,932 dated May 15, 2018, pp. 1-23.
Office Communication for U.S. Appl. No. 15/891,273 dated Jun. 19, 2018, pp. 1-20.
Office Communication for U.S. Appl. No. 15/014,932 dated Jul. 16, 2018, pp. 1-4.
Office Communication for U.S. Appl. No. 15/690,135 dated May 22, 2018, pp. 1-7.
Office Communication for U.S. Appl. No. 15/984,197 dated Aug. 31, 2018, pp. 1-25.
Office Communication for U.S. Appl. No. 15/891,311 dated Sep. 24, 2018, pp. 1-14.
Office Communication for U.S. Appl. No. 16/048,939 dated Sep. 19, 2018, pp. 1-9.
Office Communication for U.S. Appl. No. 16/113,442 dated Nov. 6, 2018, pp. 1-10.
Office Communication for U.S. Appl. No. 16/100,116 dated Nov. 15, 2018, pp. 1-7.
Office Communication for U.S. Appl. No. 15/014,932 dated Nov. 23, 2018, pp. 1-10.
Office Communication for U.S. Appl. No. 16/107,509 dated Oct. 26, 2018, pp. 1-26.
Office Communication for U.S. Appl. No. 15/891,273 dated Jan. 15, 2019, pp. 1-23.
Office Communication for U.S. Appl. No. 15/891,311 dated Jan. 29, 2019, pp. 1-8.
Office Communication for U.S. Appl. No. 16/174,051 dated Jan. 29, 2019, pp. 1-21.
Office Communication for U.S. Appl. No. 15/671,060 dated May 8, 2019, pp. 1-19.
Office Communication for U.S. Appl. No. 16/113,442 dated Jun. 5, 2019, pp. 1-8.
Office Communication for U.S. Appl. No. 15/891,273 dated May 28, 2019, pp. 1-14.
Office Communication for U.S. Appl. No. 16/107,509 dated Apr. 1, 2019, pp. 1-21.
Office Communication for U.S. Appl. No. 16/048,939 dated Jun. 20, 2019, pp. 1-8.
Office Communication for U.S. Appl. No. 16/100,116 dated May 30, 2019, pp. 1-5.
Office Communication for U.S. Appl. No. 16/384,574 dated May 31, 2019, pp. 1-12.
Office Communication for U.S. Appl. No. 16/107,509 dated Jun. 14, 2019, pp. 1-5.
Office Communication for U.S. Appl. No. 16/107,509 dated Aug. 21, 2019, pp. 1-25.
Office Communication for U.S. Appl. No. 16/384,574 dated Oct. 8, 2019, pp. 1-13.
Office Communication for U.S. Appl. No. 16/543,243 dated Sep. 27, 2019, pp. 1-24.
Office Communication for U.S. Appl. No. 16/048,939 dated Dec. 5, 2019, pp. 1-9.
Office Communication for U.S. Appl. No. 16/565,109 dated Nov. 27, 2019, pp. 1-18.
Office Communication for U.S. Appl. No. 16/525,290 dated Oct. 31, 2019, pp. 1-9.
Office Communication for U.S. Appl. No. 16/532,275 dated Oct. 24, 2019, pp. 1-29.
Office Communication for U.S. Appl. No. 16/560,886 dated Dec. 6, 2019, pp. 1-17.
Office Communication for U.S. Appl. No. 14/500,893 dated Feb. 18, 2015, pp. 1-11.
Office Communication for U.S. Appl. No. 14/518,996 dated Apr. 20, 2015, pp. 1-37.
Office Communication for U.S. Appl. No. 14/500,893 dated Jun. 15, 2015, pp. 1-12.
Office Communication for U.S. Appl. No. 14/518,996 dated Jul. 21, 2015, pp. 1-17.
Office Communication for U.S. Appl. No. 14/695,690 dated Sep. 9, 2015, pp. 1-41.
Office Communication for U.S. Appl. No. 14/695,690 dated Feb. 24, 2016, pp. 1-11.
Office Communication for U.S. Appl. No. 15/150,354 dated Jul. 5, 2016, pp. 1-18.
Extended European Search Report for European Patent Application No. 16166907.2 dated Sep. 30, 2016, pp. 1-7.
Office Communication for U.S. Appl. No. 15/150,354 dated Feb. 8, 2017, pp. 1-8.
Office Communication for U.S. Appl. No. 15/466,248 dated Jun. 5, 2017, pp. 1-30.
Office Communication for U.S. Appl. No. 15/466,248 dated Oct. 3, 2017, pp. 1-34.
Office Communication for U.S. Appl. No. 15/457,886 dated Jan. 5, 2018, pp. 1-11.
Office Communication for U.S. Appl. No. 15/466,248 dated Jan. 11, 2018, pp. 1-2.
Examination Report for European Patent Application No. 16166907.2 dated Mar. 9, 2018, pp. 1-4.

(56) References Cited

OTHER PUBLICATIONS

Office Communication for U.S. Appl. No. 15/466,248 dated Mar. 8, 2018, pp. 1-34.
Office Communication for U.S. Appl. No. 15/457,886 dated Jul. 18, 2018, pp. 1-11.
Office Communication for U.S. Appl. No. 15/466,248 dated Jul. 11, 2018, pp. 1-31.
International Search Report and Written Opinion for International Patent Application No. PCT/US2017/068585 dated Jul. 4, 2018, pp. 1-11.
Extended European Search Report for European Patent Application. No. 17210995.1 dated Jul. 6, 2018, pp. 1-11.
Office Communication for U.S. Appl. No. 15/466,248 dated Oct. 18, 2018, pp. 1-31.
Office Communication for U.S. Appl. No. 15/457,886 dated Mar. 20, 2019, pp. 1-9.
Office Communication for U.S. Appl. No. 15/466,248 dated May 16, 2019, pp. 1-33.
Office Communication for U.S. Appl. No. 15/466,248 dated Sep. 10, 2019, pp. 1-27.
Office Communication for U.S. Appl. No. 15/971,843 dated Oct. 22, 2019, pp. 1-15.
Office Communication for U.S. Appl. No. 14/750,905 dated Sep. 22, 2015, pp. 1-12.
Office Communication for U.S. Appl. No. 14/750,905 dated Jan. 19, 2016, pp. 1-5.
Office Communication for U.S. Appl. No. 15/082,925 dated Sep. 13, 2016, pp. 1-7.
Office Communication for U.S. Appl. No. 15/289,760 dated Dec. 12, 2016, pp. 1-12.
Office Communication for U.S. Appl. No. 15/219,016 dated Nov. 22, 2016, pp. 1-12.
Office Communication for U.S. Appl. No. 15/356,381 dated Jan. 6, 2017, pp. 1-57.
Office Communication for U.S. Appl. No. 15/082,925 dated Feb. 1, 2017, pp. 1-6.
Office Communication for U.S. Appl. No. 15/219,016 dated Mar. 16, 2017, pp. 1-9.
Office Communication for U.S. Appl. No. 15/443,868 dated Apr. 27, 2017, pp. 1-7.
Office Communication for U.S. Appl. No. 15/585,887 dated Jun. 27, 2017, pp. 1-24.
Office Communication for U.S. Appl. No. 15/356,381 dated Jul. 3, 2017, pp. 1-21.
Office Communication for U.S. Appl. No. 15/675,216 dated Jun. 7, 2018, pp. 1-4.
Office Communication for U.S. Appl. No. 15/443,868 dated Aug. 11, 2017, pp. 1-11.
Office Communication for U.S. Appl. No. 15/675,216 dated Nov. 20, 2017, pp. 1-7.
Office Communication for U.S. Appl. No. 15/585,887 dated Nov. 28, 2017, pp. 1-23.
International Search Report and Written Opinion for International Patent Application No. PCT/US2018/030145 dated Aug. 10, 2018, pp. 1-12.
International Search Report and Written Opinion for International Patent Application No. PCT/US2017/068586 dated Aug. 9, 2018, pp. 1-14.
Extended European Search Report for European Patent Application No. 17210996.9 dated Jun. 13, 2018, pp. 1-7.
Office Communication for U.S. Appl. No. 15/855,769 dated Feb. 5, 2019, pp. 1-10.
Office Communication for U.S. Appl. No. 15/855,769 dated May 1, 2019, pp. 1-7.
Office Communication for U.S. Appl. No. 16/459,472 dated Aug. 14, 2019, pp. 1-15.
Office Communication for U.S. Appl. No. 15/585,887 dated Mar. 20, 2019, pp. 1-26.
Office Communication for U.S. Appl. No. 15/675,216 dated Aug. 28, 2018, pp. 1-14.
Office Communication for U.S. Appl. No. 15/675,216 dated Jan. 29, 2019, pp. 1-8.
Office Communication for U.S. Appl. No. 16/384,697 dated May 30, 2019, pp. 1-12.
Office Communication for U.S. Appl. No. 16/384,574 dated Jan. 13, 2020, pp. 1-9.
Office Communication for U.S. Appl. No. 16/107,509 dated Jan. 23, 2020, pp. 1-12.
Office Communication for U.S. Appl. No. 15/585,887 dated Jan. 22, 2020, pp. 1-28.
Office Communication for U.S. Appl. No. 16/384,697 dated Oct. 17, 2019, pp. 1-8.
Office Communication for U.S. Appl. No. 16/459,472 dated Feb. 3, 2020, pp. 1-7.
Office Communication for U.S. Appl. No. 16/679,055 dated Feb. 14, 2020, pp. 1-32.
Office Communication for U.S. Appl. No. 16/048,939 dated Feb. 18, 2020, pp. 1-6.
Office Communication for U.S. Appl. No. 16/424,387 dated Feb. 24, 2020, pp. 1-15.
Office Communication for U.S. Appl. No. 16/718,050 dated Feb. 27, 2020, pp. 1-21.
Office Communication for U.S. Appl. No. 16/525,290 dated Mar. 12, 2020, pp. 1-10.
Office Communication for U.S. Appl. No. 15/971,843 dated Mar. 26, 2020, pp. 1-14.
Office Communication for U.S. Appl. No. 16/048,939 dated Mar. 26, 2020, pp. 1-6.
Office Communication for U.S. Appl. No. 16/543,243 dated Apr. 7, 2020, pp. 1-22.
Office Communication for U.S. Appl. No. 16/532,275 dated Apr. 20, 2020, pp. 1-8.
Office Communication for U.S. Appl. No. 16/560,886 dated Apr. 22, 2020, pp. 1-10.
Office Communication for U.S. Appl. No. 16/565,109 dated May 8, 2020, pp. 1-19.
Office Communication for U.S. Appl. No. 16166907.2 dated Dec. 19, 2019, pp. 1-6.
Examination Report for European Patent Application No. 17210996.9 dated May 27, 2020, pp. 1-3.
Office Communication for U.S. Appl. No. 15/585,887 dated Aug. 28, 2020, pp. 1-30.
Office Communication for U.S. Appl. No. 16/679,055 dated Sep. 4, 2020, pp. 1-5.
Office Communication for U.S. Appl. No. 16/718,050 dated Sep. 4, 2020, pp. 1-23.
Office Communication for U.S. Appl. No. 16/525,290 dated Sep. 23, 2020, pp. 1-10.
International Search Report and Written Opinion for International Patent Application No. PCT/US2019/030015 dated Aug. 7, 2019, pp. 1-6.
International Search Report and Written Opinion for International Patent Application No. PCT/US2019/018097 dated May 28, 2019, pp. 1-9.
Office Communication for U.S. Appl. No. 15/971,843 dated Oct. 27, 2020, pp. 1-11.
Office Communication for U.S. Appl. No. 16/424,387 dated Nov. 24, 2020, pp. 1-23.
Office Communication for U.S. Appl. No. 16/543,243 dated Dec. 16, 2020, pp. 1-13.
Office Communication for U.S. Appl. No. 16/565,109 dated Jan. 19, 2021, pp. 1-9.
Office Communication for U.S. Appl. No. 16/813,649 dated Feb. 24, 2021, pp. 1-7.
Office Communication for U.S. Appl. No. 16/679,055 dated Mar. 16, 2021, pp. 1-33.
Office Communication for U.S. Appl. No. 15/585,887 dated Mar. 26, 2021, pp. 1-31.
Office Communication for U.S. Appl. No. 16/525,290 dated Mar. 31, 2021, pp. 1-11.
Office Communication for U.S. Appl. No. 15/971,843 dated May 5, 2021, pp. 1-9.

(56) References Cited

OTHER PUBLICATIONS

Office Communication for U.S. Appl. No. 16/820,582 dated May 10, 2021, pp. 1-24.
Office Communication for U.S. Appl. No. 16/525,290 dated Jun. 15, 2021, pp. 1-4.
Examination Report for European Patent Application No. 17210996.9 dated May 21, 2021, pp. 1-6.
Office Communication for U.S. Appl. No. 16/525,290 dated Jul. 9, 2021, pp. 1-7.
Office Communication for U.S. Appl. No. 16/679,055 dated Jul. 26, 2021, pp. 1-34.
Office Communication for U.S. Appl. No. 16/718,050 dated Jul. 27, 2021, pp. 1-23.
Office Communication for U.S. Appl. No. 15/971,843 dated Jul. 28, 2021, pp. 1-9.
Office Communication for U.S. Appl. No. 15/585,887 dated Aug. 17, 2021, pp. 1-41.
Office Communication for U.S. Appl. No. 16/820,582 dated Sep. 27, 2021, pp. 1-25.
Office Communication for U.S. Appl. No. 16/679,055 dated Oct. 12, 2021, pp. 1-3.
Office Communication for U.S. Appl. No. 17/351,866 dated Oct. 18, 2021, pp. 1-12.
Office Communication for U.S. Appl. No. 17/337,299 dated Oct. 21, 2021, pp. 1-34.
Office Communication for U.S. Appl. No. 15/585,887 dated Nov. 2, 2021, pp. 1-4.
Office Communication for U.S. Appl. No. 16/679,055 dated Nov. 12, 2021, pp. 1-34.
Office Communication for U.S. Appl. No. 17/483,435 dated Nov. 30, 2021, pp. 1-21.
Office Communication for U.S. Appl. No. 17/483,148 dated Dec. 13, 2021, pp. 1-28.
Office Communication for U.S. Appl. No. 16/813,649 dated Dec. 20, 2021, pp. 1-44.
Office Communication for U.S. Appl. No. 17/226,947 dated Dec. 30, 2021, pp. 1-6.
Office Communication for U.S. Appl. No. 16/820,582 dated Jan. 14, 2022, pp. 1-13.
Office Communication for U.S. Appl. No. 16/989,025 dated Jan. 19, 2022, pp. 1-12.
Supplementary European Search Report for European Patent Application No. 19804040.4 dated Jan. 25, 2022, pp. 1-4.
Office Communication for U.S. Appl. No. 17/351,866 dated Feb. 9, 2022, pp. 1-9.
International Search Report and Written Opinion for International Patent Application No. PCT/US2021/051757 dated Jan. 11, 2022, pp. 1-9.
Office Communication for U.S. Appl. No. 17/337,299 dated Feb. 17, 2022, pp. 1-14.
Office Communication for U.S. Appl. No. 16/679,055 dated Mar. 2, 2022, pp. 1-35.
Office Communication for U.S. Appl. No. 15/585,887 dated Mar. 24, 2022, pp. 1-40.
Office Communication for U.S. Appl. No. 17/318,423 dated Mar. 29, 2022, pp. 1-21.
Office Communication for U.S. Appl. No. 16/989,343 dated Mar. 29, 2022, pp. 1-5.
Office Communication for U.S. Appl. No. 16/813,649 dated Apr. 1, 2022, pp. 1-4.
Extended European Search Report for European Patent Application No. 19846527.0 dated Apr. 4, 2022, pp. 1-9.
Handel, Theodore G. et al., "Hiding data in the OSI network model." In: Anderson R. (eds) Information Hiding. IH 1996. Lecture Notes in Computer Science, vol. 1174. Springer, Berlin, Heidelberg. pp. 23-38.
Handley, Mark et al., "Network Intrusion Detection: Evasion, Traffic Normalization, and End-to-End Protocol Semantics," 2011, International Computer Science Institute, pp. 1-17.
Information Sciences Institute, "Internet Protocol Darpa Internet Program Protocol Specification," Sep. 1981, pp. 1-36.
Fuertes, Juan Antonio Cordero, "Evaluation of OSPF Extensions in MANET Routing," Paris, 2007, pp. 1-192.
Parsons, Christopher, "Moving Across the Internet: Code-Bodies, Code-Corpses, and Network Architecture," May 9, 2010, pp. 1-20.
Zander, Sebastian et al., "Covert Channels and Countermeasures in Computer Network Protocols," Dec. 2007, pp. 1-7.
Lin, Mark, "An Overview of Session Hijacking at the Network and Application Levels," Jan. 18, 2005, pp. 1-16.
Digital Imaging and Communications in Medicine (DICOM), Part 6: Data Dictionary, PS 3.6-2011. 2011, http://dicom.nema.org/Dicom/ 2011 /11_06pu.pdf, pp. 1-216.
Health Level Seven, Version 2.6, Appendix A. Nov. 2007, https:// www.hl7.org/special/committees/vocab/V26_Appendix_A.pdf, pp. 1-255.
Mozilla Developer Network, "NSS Key Log Format," https:// developer.mozilla.org/en-US/docs/Mozilla/Projects/NSS/Key_LogFormat, Jan. 8, 2010, p. 1.
Shaver, Jim, "Decrypting TLS Browser Traffic with Wireshark the easy way", https://jimshaver.net/2015/02/11/decrypting-tls-browser-traffic-with-wireshark-the-easy-way/, Feb. 11, 2015, pp. 1-30.
Svoboda, Jakub, "Network Traffic Analysis with Deep Packet Inspection Method," Masaryk University, Faculty of Informatics, Master's Thesis, 2014, pp. 1-74.
Wade, Susan Marie, ""SCADA Honeynets: The attractiveness of honeypots as critical infrastructure security tools for the detection and analysis of advanced threats"" (2011). Graduate Theses and Dissertations. 12138. https://lib.dr.iastate.edu/etd/12138, pp. 1-67.
Examination Report for European Patent Application No. 16166907.2 dated Dec. 19, 2019, pp. 1-6.
"Kerberos Overview—An Authentication Service for Open Network Systems," Cisco Systems, Inc., Jan. 19, 2006, https://www.cisco.com/c/en/us/support/docs/security-vpn/kerberos/16087-1.html, Accessed: Feb. 9, 2022, pp. 1-16.
Conry-Murray, Andrew, "Security Event Management Gets Specialized," Network Magazine, CMP Media, vol. 20, Nov. 2005, pp. 1-6.
Office Communication for U.S. Appl. No. 16/679,055 dated May 11, 2022, pp. 1-3.
Office Communication for U.S. Appl. No. 16/813,649 dated May 11, 2022, pp. 1-16.
Beckett, David et al., "New Sensing Technique for Detecting Application Layer DDoS Attacks Targeting Back-end Database Resources," IEEE International Conference on Communications (ICC 2017), May 2017, pp. 1-7.
Office Communication for U.S. Appl. No. 16/989,025 dated May 23, 2022, pp. 1-14.
Office Communication for U.S. Appl. No. 16/679,055 dated Jun. 3, 2022, pp. 1-34.
Office Communication for U.S. Appl. No. 17/722,217 dated Jun. 29, 2022, pp. 1-23.
Office Communication for U.S. Appl. No. 17/226,947 dated Jul. 11, 2022, pp. 1-13.
Office Communication for U.S. Appl. No. 17/722,217 dated Jul. 15, 2022, pp. 1-7.
Office Communication for U.S. Appl. No. 17/721,514 dated Jul. 21, 2022, pp. 1-7.
Office Communication for U.S. Appl. No. 16/989,343 dated Aug. 11, 2022, pp. 1-9.
Office Communication for U.S. Appl. No. 16/989,343 dated Aug. 17, 2022, pp. 1-5.
Office Communication for U.S. Appl. No. 15/585,887 dated Sep. 1, 2022, pp. 1-39.
Office Communication for U.S. Appl. No. 17/861,373 dated Sep. 9, 2022, pp. 1-18.
Office Communication for U.S. Appl. No. 17/318,423 dated Sep. 13, 2022, pp. 1-15.
Office Communication for U.S. Appl. No. 17/721,514 dated Sep. 20, 2022, pp. 1-8.
Office Communication for U.S. Appl. No. 16/679,055 dated Sep. 21, 2022, pp. 1-25.

(56) References Cited

OTHER PUBLICATIONS

Office Communication for U.S. Appl. No. 17/318,423 dated Sep. 22, 2022, pp. 1-2.
Office Communication for U.S. Appl. No. 17/861,373 dated Jan. 11, 2023, pp. 1-10.
Office Communication for U.S. Appl. No. 17/861,373 dated Jan. 19, 2023, pp. 1-2.
Office Communication for U.S. Appl. No. 17/515,963 dated Jan. 24, 2023, pp. 1-8.
Office Communication for U.S. Appl. No. 17/515,963 dated Feb. 1, 2023, pp. 1-2.
Office Communication for U.S. Appl. No. 17/214,555 dated Mar. 21, 2023, pp. 1-25.
Office Communication for U.S. Appl. No. 17/712,521 dated Mar. 21, 2023, pp. 1-13.
Office Communication for U.S. Appl. No. 16/679,055 dated Sep. 28, 2022, pp. 1-2.
Office Communication for U.S. Appl. No. 17/515,963 dated Oct. 7, 2022, pp. 1-27.
Office Communication for U.S. Appl. No. 17/721,514 dated Oct. 11, 2022, pp. 1-2.
Office Communication for U.S. Appl. No. 17/516,063 dated Oct. 31, 2022, pp. 1-10.
Office Communication for U.S. Appl. No. 17/214,555 dated Nov. 10, 2022, pp. 1-21.
Office Communication for U.S. Appl. No. 15/585,887 dated Nov. 21, 2022, pp. 1-6.
Office Communication for U.S. Appl. No. 15/585,887 dated Dec. 22, 2022, pp. 1-38.
Office Communication for U.S. Appl. No. 17/516,063 dated May 19, 2023, pp. 1-10.
Office Communication for U.S. Appl. No. 15/585,887 dated Jun. 7, 2023, pp. 1-43.
Office Communication for U.S. Appl. No. 17/516,063 dated Jul. 31, 2023, pp. 1-3.
Office Communication for U.S. Appl. No. 17/712,521 dated Aug. 2, 2023, pp. 1-14.
Office Communication for U.S. Appl. No. 17/516,063 dated Aug. 11, 2023, pp. 1-11.

* cited by examiner

DETECTING ABNORMAL DATA ACCESS BASED ON DATA SIMILARITY

TECHNICAL FIELD

The present invention relates generally to network monitoring, and more particularly, but not exclusively, to monitoring networks in a distributed network monitoring environment to detect abnormal data access.

BACKGROUND

On most computer networks, bits of data arranged in bytes are packaged into collections of bytes called packets. These packets are generally communicated between computing devices over networks in a wired or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from seven to four, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software entity running on the client or server. In virtual environments, port mirroring may be performed on a virtual switch that is incorporated within the hypervisor.

In some cases, organizations may segregate information based on importance or sensitivity. Accordingly, in some embodiments, security focused organizations may designate particular storage policies to different types of data based on the importance or sensitivity of the data. Different storage policies for different types of data enables organizations to assign more rigorous/vigilant policies to data that is more important or more sensitive. However, in some cases, users may deliberately or inadvertently subvert storage policies. Likewise, in some cases, as organization grow, increasing portions of their important or sensitive data may escape from storage policies. Also, in some cases, the subversion of storage policies may be transient making it difficult to detect or observe because the documents of interest may be removed from non-conforming storage locations before they are detected. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
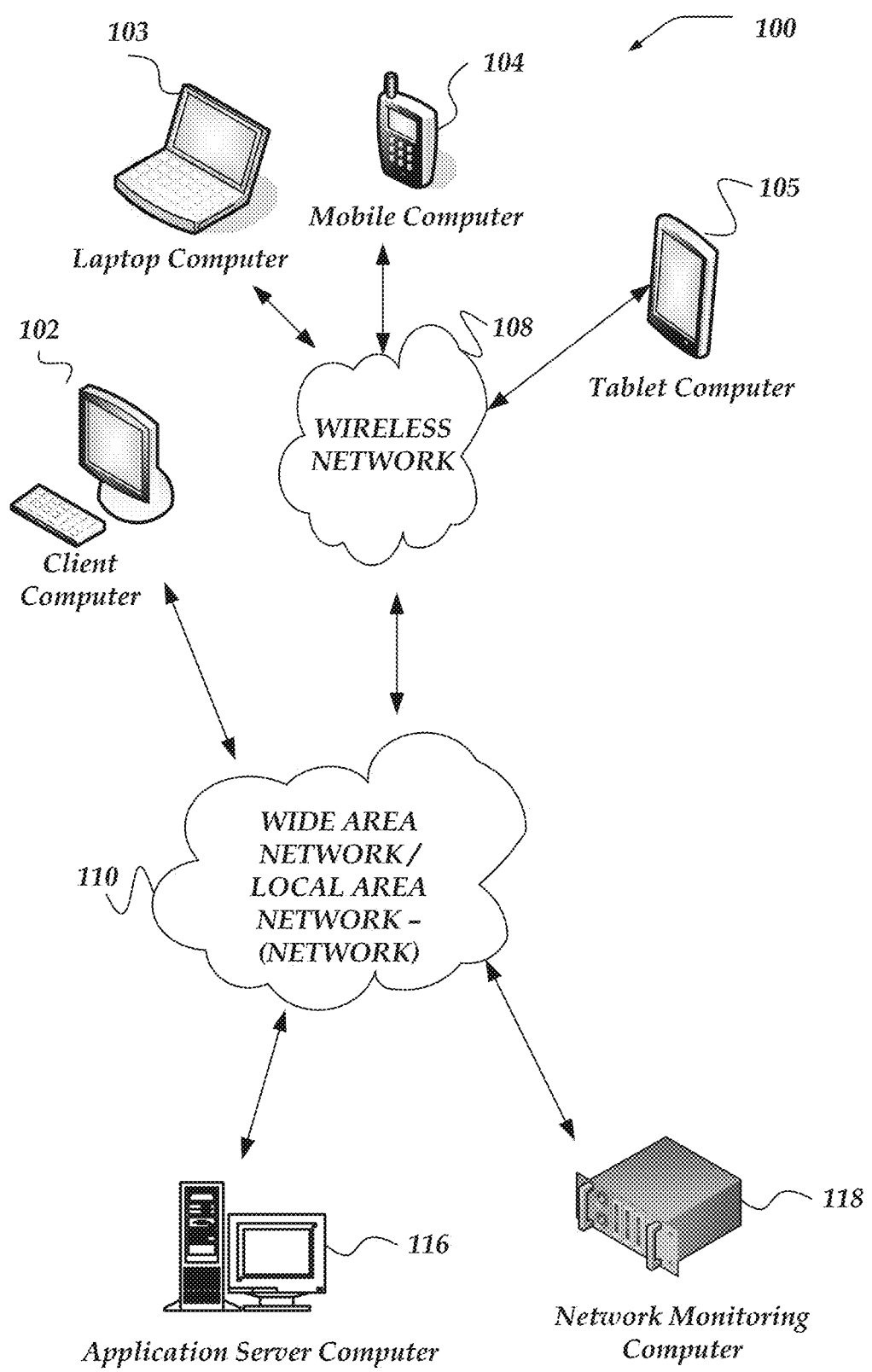
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In one or more of the various embodiments, flows may be useful if one or more of the endpoints of a session may be behind a network traffic management device, such as a firewall, switch, router, load balancer, or the like. In one or more of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as, FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like. In cases, related flows may be flows in different networks or network segments that may be associated with the same user, application, client computer, source, destination, or the like.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In one or more embodiments, the NMC may passively monitor network packet traffic without participating in the communication protocols. This monitoring may be performed for a variety of reasons, including troubleshooting and proactive remediation, anomaly detection, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated or applied over time to further classify the observed protocols. In some embodiments, NMCs may be arranged to employ stateful analysis. Accordingly, for each supported protocols, an NMC may use network packet payload data to drive a state machine that mimics the protocol state changes in the client/server flows being monitored. The NMC may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In addition, in one or more of the various embodiments, NMCs or NMC functionality may be implemented using hardware or software based proxy devices that may be arranged to intercept network traffic in the monitored networks rather than being restricted to passive (pass through) monitoring.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicate data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "entity" refers to an actor in the monitored network. Entities may include applications, services, programs, processes, network devices, network computers, client computers, or the like, operating in the monitored network. For example, individual entities may include, web clients, web servers, database clients, database servers, mobile app clients, payment processors, groupware clients, groupware services, or the like. In some cases, multiple entities may co-exist on or in the same network computer, process, application, compute container, or cloud compute instance.

As used herein, the term "observation port" refers to network taps, wireless receivers, port mirrors or directed tunnels from network switches, clients or servers, virtual machines, cloud computing instances, other network infrastructure devices or processes, or the like, or combination thereof. Observation ports may provide a copy of each network packet included in wire traffic on a particular network segment or virtual local area network (VLAN). Also, for at least some of the various embodiments, observation ports may provide NMCs network packet copies through a port mirror on a managed Ethernet switch, e.g., a Switched Port Analyzer (SPAN) port, or a Roving Analysis Port (RAP).

As used herein, the term, "protocol" refers generally to network protocols that may be employed in a network, including data-link layer protocols, transport layer protocols, application layer protocols, or the like. Thus, unless otherwise indicated, innovations described as working with or being associated with a protocol may be applicable to protocols of various OSI layers, or the like, or combination thereof.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed monitoring network traffic using one or more network monitoring computers. In one or more of the various embodiments, activity associated with accessing a document in the network or a file system may be determined based on the monitored network traffic.

In one or more of the various embodiments, a profile may be generated based on a summarization of the activity associated with the document access such that the profile may be stored in a data store that stores one or more other profiles that may be based on other activity associated with accessing one or more other documents.

In one or more of the various embodiments, two or more similar profiles may be determined based on a classification of each profile in the data store based on one or more similarities between the profile and the one or more other profiles in the data store.

In one or more of the various embodiments, in response to determining two or more similar profiles, one or more locations in the network associated with two or more documents that correspond to the two or more similar profiles may be determined based on the two or more similar profiles.

In one or more of the various embodiments, the one or more locations may be classified based on the activity, the two or more similar profiles and one or more access policies associated with each location.

In one or more of the various embodiments, in response to one or more portions of the one or more locations being classified as inconsistent with the one or more access policies, generating one or more reports that include information associated with one or more of the document, the activity, the one or more locations classified as being inconsistent with the one or more access policies, or the like.

In one or more of the various embodiments, generating a profile may include: providing one or more summarization models that may be trained to determine one or more values that summarize one or more characteristics of the activity associated with the document access; employing the one or more summarization models to generate the one or more values that summarize the one or more characteristics the activity associated with the document access such that the one or more characteristics may include one or more of document sizes, patterns of access, meta-data visible in the network traffic, file system locations, user/session characteristics, content, semantic content, similarities to other documents or associated activity, or the like; including the one or more values in the profile; or the like.

In one or more of the various embodiments, determining the two or more similar profiles may include: providing one or more recognition models that are trained to recognize similarities between the profile and the one or more other profiles; providing the profile and the one or more other profiles from the data store to the one or more recognition models; determining the two or more similar profiles based on the one or more recognition models; or the like.

In one or more of the various embodiments, classifying the one or more locations based on the activity may include: determining a source location where the document may be stored based on the activity associated with the document access; determining one or more target locations where the document may be stored as a result of the activity associated with the document access; comparing a first access policy that may be associated with the one or more source locations with a second access policy that may be associated with the one or more target locations; or the like.

In one or more of the various embodiments, classifying the one or more locations may include: determining one or more characteristics of the document based on the profile; further classifying the one or more locations based on the one or more characteristics of the documents, wherein the one or more classified locations include one or more of a local directory in the file system, a shared directory in the file system, a removeable media storage device, or a File Transfer Protocol (FTP) server, or an object store in a cloud computing environment; or the like.

In one or more of the various embodiments, determining the one or more locations in the network may include: determining one or more access requests based on the monitored network traffic; determining the one or more locations based on a number of the access requests exceeding a threshold value; or the like.

In one or more of the various embodiments, classifying the one or more locations in the network may include: determining one or more sensitive documents based on the monitored network traffic such that the one or more sensitive documents include one or more of a human resources document, a sales list, a customer list, or a trade secret; further classifying the one or more locations based on an association with the one or more sensitive documents; or the like.

In one or more of the various embodiments, the document or the one or more other documents may comprise structured or unstructured data that may be stored in an accessible format such that the accessible format includes, one or more of file formats, database rows, database dumps, backup archives, log files, Software-as-a-Service storage services, Representational State Transfer Application programming interfaces (REST API) responses, or the like.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)—(network) 110, wireless network 108, client computers 102-105, application server computer 116, network monitoring computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, network monitoring computer 118, or other computers.

Client computers 102-105 may further be configured to include a client application that enables an end-user to log into an end-user account that may be managed by another computer, such as application server computer 116, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to network monitoring computer 118. Also, client computers may be arranged to enable users to display reports, interactive user-interfaces, results provided by network monitor computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. One embodiment of network monitoring computer 118 is described in more detail below in conjunction with FIG. 3. Although FIG. 1 illustrates application server computer 116, and network monitoring computer 118, each as a single computer, the innovations or embodiments are not so limited. For example, one or more functions of application server computer 116, network monitoring computer 118, or the like, may be distributed across one or more distinct network computers. Moreover, in one or more embodiments, network monitoring computer 118 may be implemented using a plurality of network computers. Further, in one or more of the various embodiments, application server computer 116, or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
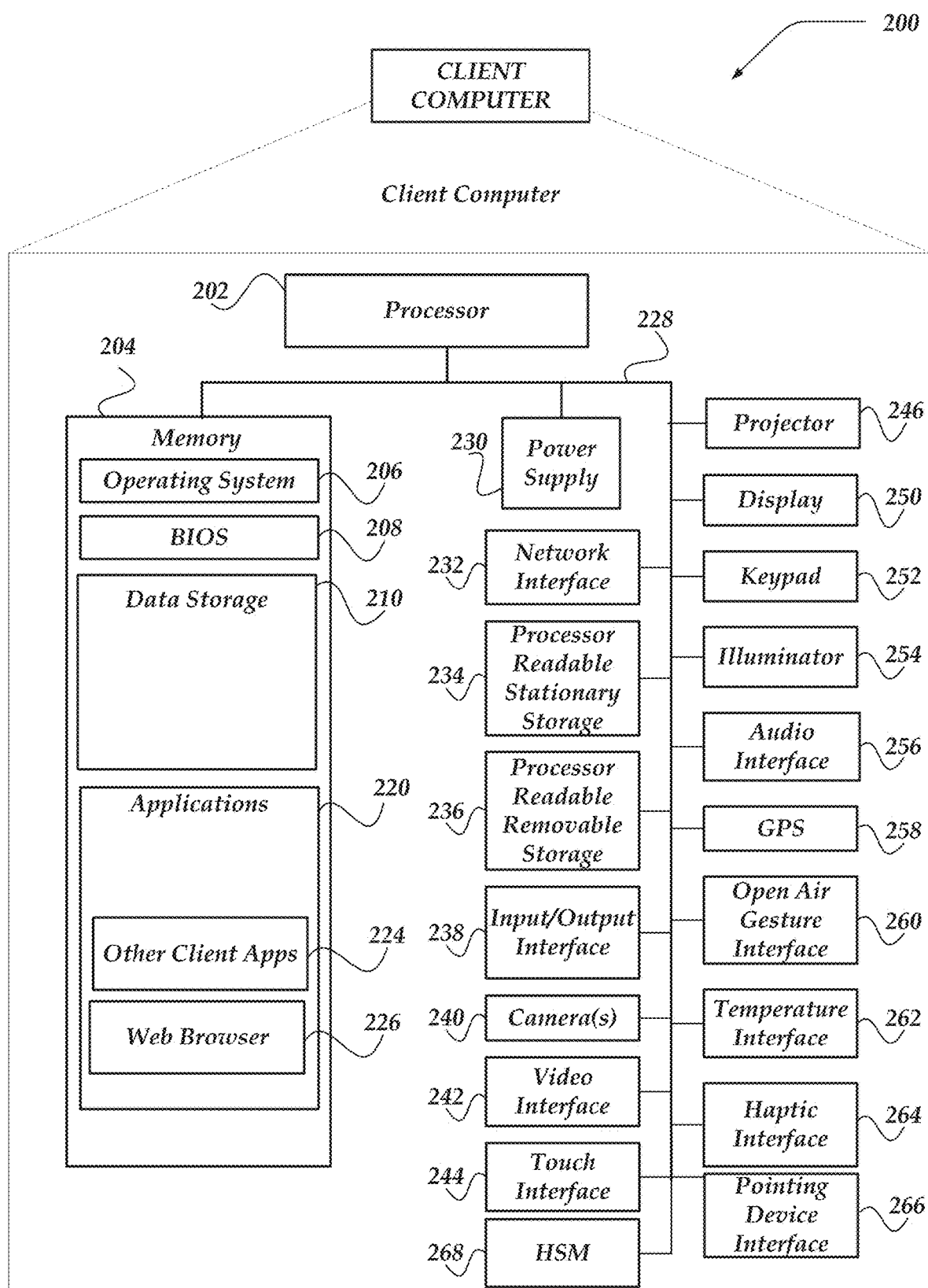
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers or network monitoring computers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
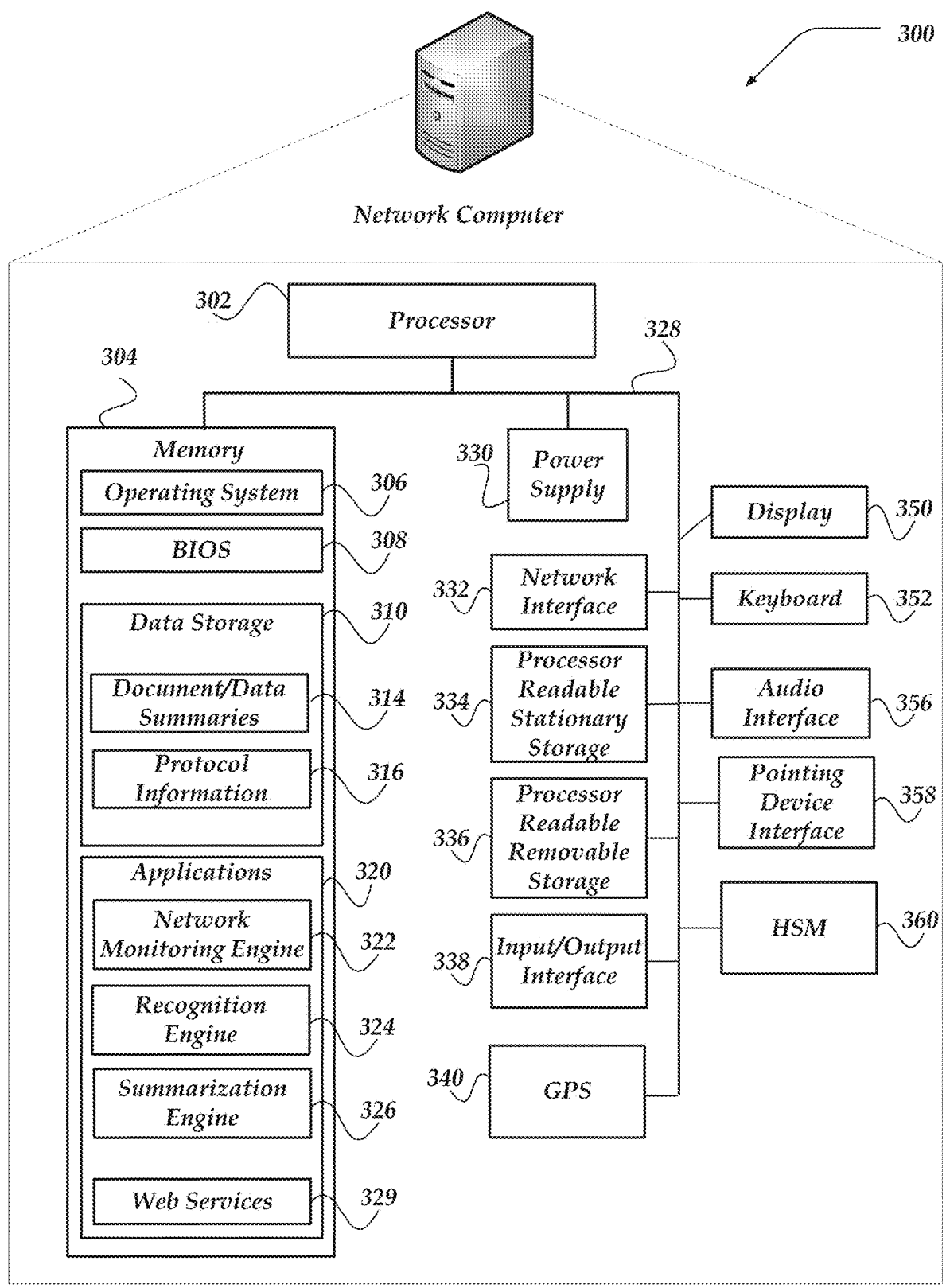
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, network monitoring engine 322, recognition engine 324, summarization engine 326, web services 329, or the like, may be arranged to employ geo-location information to select one or more localization features, such as, time zones, languages, currencies, calendar formatting, or the like. Also, localization features may be used when interpreting network traffic, monitoring application protocols, user-interfaces, generating reports, monitoring networks in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, document summaries database 314, protocol information 316, or the like. Protocol information 316 may store various rules or configuration information related to one or more network communication protocols, including application protocols, secure communication protocols, client-server protocols, peer-to-peer protocols, shared file system protocols, protocol state machines, or the like, that may be employed for protocol analysis, entity auto-discovery, anomaly detections, or the like, in a monitored network environment.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, recognition engine 324, summarization engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, network monitoring engine 322, recognition engine 324, summarization engine 326, web services 329, or the like, may be operative in a cloud-based computing environment. In one or more of the various embodiments, these applications, and others, that comprise a network monitoring computer may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to network monitoring engine 322, recognition engine 324, summarization engine 326, web services 329, or the like, may be provisioned and de-commissioned automatically.

Also, in one or more of the various embodiments, network monitoring engine 322, recognition engine 324, summarization engine 326, web services 329, or the like, may be located in virtual servers running in a cloud-based computing environment rather than being tied to one or more specific physical network computers. Likewise, in some embodiments, one or more of network monitoring engine 322, recognition engine 324, summarization engine 326, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
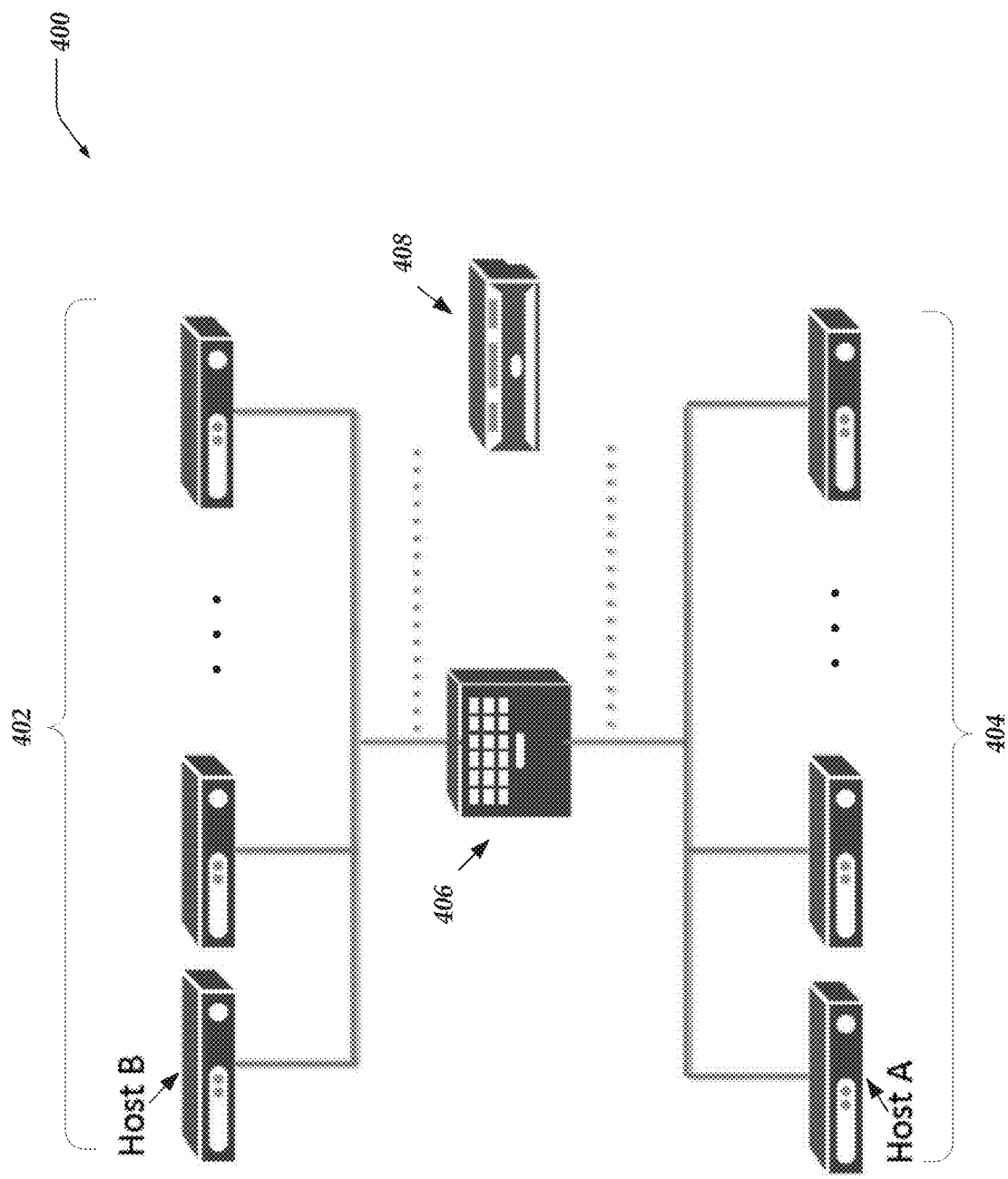
FIG. 4 illustrates a logical architecture of a system for detecting abnormal data access based on data similarity in accordance with one or more of the various embodiments.

FIG. 4 illustrates a logical architecture of system 400 for detecting abnormal data access based on data similarity in accordance with one or more of the various embodiments. System 400 may be arranged to include a plurality of network devices or network computers on first network 402 and a plurality of network devices or network computers on second network 404. In this example, communication between the first network and the second network is managed by switch 406. Also, NMC 408 may be arranged to passively monitor or record packets (network traffic) that are communicated in network flows between network devices or network computers on first network 402 and second network 404. For example, the communication of flows of packets between the Host B network computer and the Host A network computer are managed by switch 406 and NMC 408 may be passively monitoring or recording some or all of the network traffic comprising these flows.

NMC 408 may be arranged to receive network communication for monitoring through a variety of means including network taps, wireless receivers, port mirrors or directed tunnels from network switches, clients or servers including the endpoints themselves, virtual machine, cloud computing instances, other network infrastructure devices, or the like, or combination thereof. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. For example, in some embodiments, NMCs may be arranged to receive electronic signals over or via a physical hardware sensor that passively receives taps into the electronic signals that travel over the physical wires of one or more networks.

In one or more of the various embodiments, NMCs, such as, NMC 408 may be arranged to generate or collect various metrics associated with monitored network traffic. Also, in one or more of the various embodiments, NMCs, such as, NMC 408 may be arranged to analyze some or all of the monitored network traffic to determine metrics or other characteristics associated with applications, services, endpoints, or the like, that may be associated with the monitored network traffic.

Figure 5:
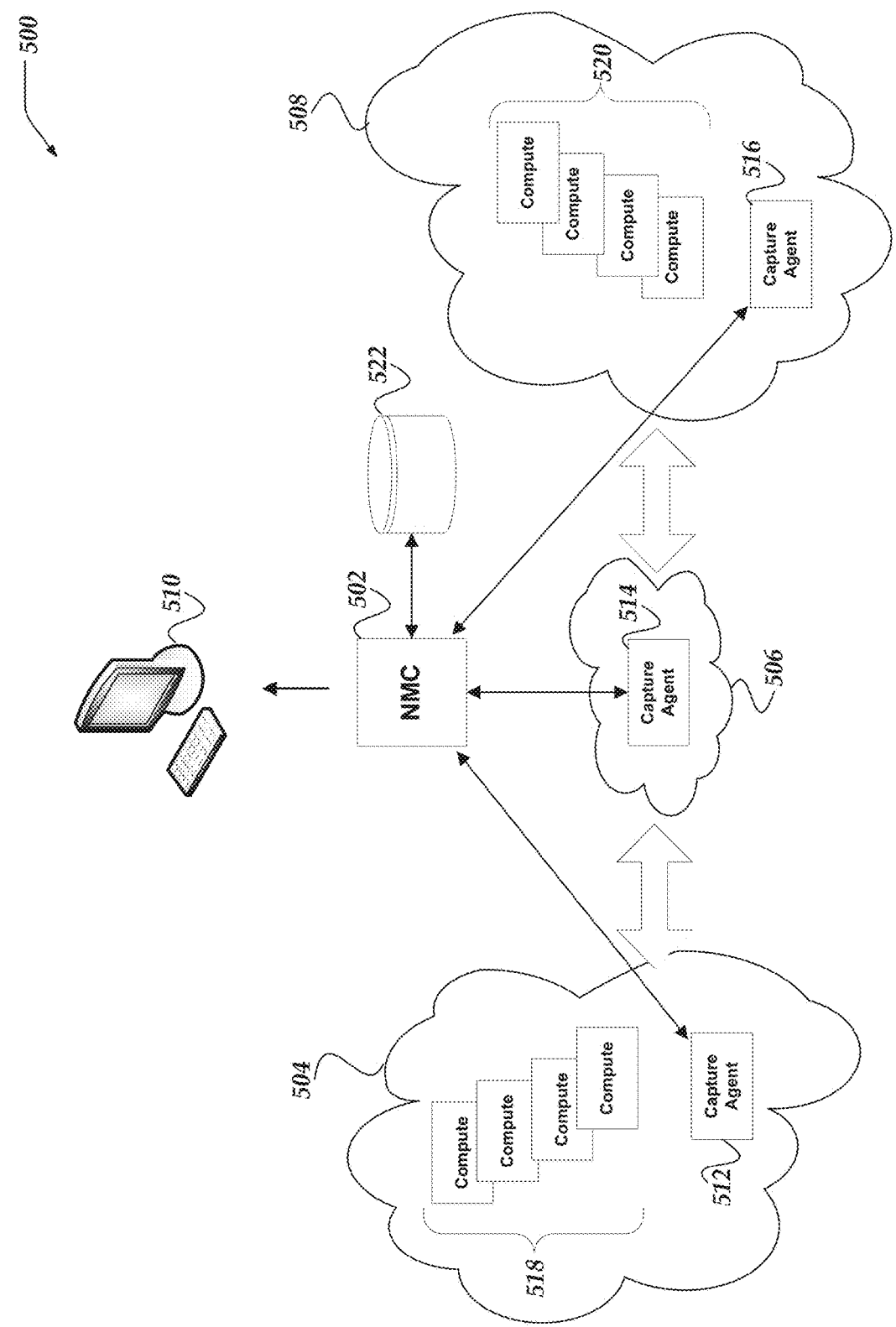
FIG. 5 illustrates a logical schematic of a system for detecting abnormal data access based on data similarity in accordance with one or more of the various embodiments.

FIG. 5 illustrates a logical schematic of system 500 for detecting abnormal data access based on data similarity in accordance with one or more of the various embodiments. In one or more of the various embodiments, an NMC, such as NMC 502 may be arranged to monitor network traffic in one or more networks, such as, network 504, network 506, or network 508. In this example, network 504, network 506, or network 508 may be considered similar to network 108 or network 110. Also, in some embodiments, one or more of network 504, network 506, or network 508 may be considered cloud computing environments. Likewise, in some embodiments, one or more of network 504, network 506, or network 508 may be considered remote data centers, local data centers, co-location computing environments, or the like, or combination thereof.

In one or more of the various embodiments, NMCs, such as NMC 502 may be arranged to communicate with one or more capture agents, such as, capture agent 512, capture agent 514, or capture agent 516. In some embodiments, capture agents may be arranged to selectively capture network traffic or collect network traffic metrics that may be provided to NMC 502 for additional analysis.

In one or more of the various embodiments, capture agents may be NMCs that may be distributed in various networks or cloud environments. For example, in some embodiments, a simplified system may include one or more NMCs that also provide capture agent services. In some embodiments, capture agents may be NMCs arranged to instantiate one or more capture engines to perform one or more capture or collection actions. Similarly, in one or more of the various embodiments, one or more capture agents may be instantiated or hosted separately from one or more NMCs.

In one or more of the various embodiments, capture agents may be selectively installed such that they may capture metrics for selected portions of the monitored networks. Also, in some embodiments, in networks that have groups or clusters of the same or similar entities, capture agents may be selectively installed on one or more entities that may be representative of entire groups or clusters of similar entities. Thus, in some embodiments, capture agents on the representative entities may collect metrics or traffic that may be used to infer the metrics or activity associated with similarly situated entities that do not include a capture agent.

Likewise, in one or more of the various embodiments, one or more capture agents may be installed or activated for a limited time period to collect information that may be used to infer activity information about the monitored networks. Accordingly, in one or more of the various embodiments, these one or more capture agents may be removed or de-activated if sufficient activity information or network traffic has been collected.

In one or more of the various embodiments, system 500 may include one or more network entities, such as, entities 518, entities 520, or the like, that communicate in or over one or more of the monitored networks. Entities 518 and entities 520 are illustrated here as cloud environment compute instances (e.g., virtual machines), or the like. However, one of ordinary skill in the art will appreciate that entities may be considered to be various network computers, network appliances, routers, switches, applications, services, containers, or the like, subject to network monitoring by one or more NMCs. (See, FIG. 4, as well).

In this example, for one or more of the various embodiments, capture agents, such as capture agent 512 may be to arranged capture network traffic or network traffic metrics associated with one or more entities, such as, entities 518. Accordingly, in some embodiments, some or all of the information captured by capture agents may be provided to one or more NMCs, such as, NMC 502 for additional analysis. Also, in one or more of the various embodiments, capture agents or NMCs may be arranged to selectively store network traffic in a captured data store, such as, captured data store 522. In one or more of the various embodiments, NMCs may be arranged to employ rules, pattern matching, machine learning models, instructions, parameter settings, threshold/trigger values, or the like, provided via configuration information for monitoring or capturing network traffic.

Figure 6:
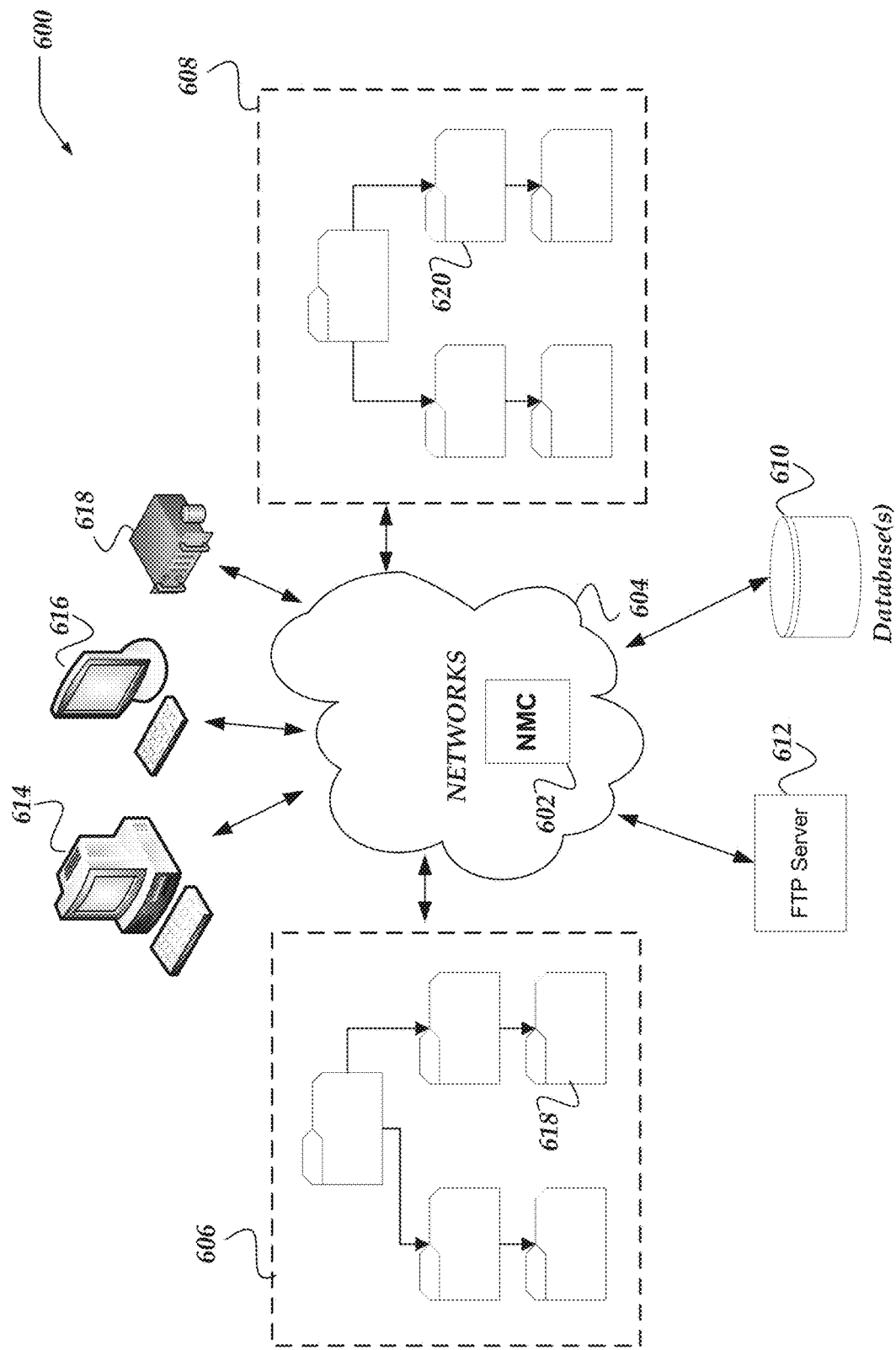
FIG. 6 illustrates a logical schematic of a system for detecting abnormal data access based on data similarity in accordance with one or more of the various embodiments.

FIG. 6 illustrates a logical schematic of system 600 for detecting abnormal data access based on data similarity in accordance with one or more of the various embodiments. In one or more of the various embodiments, system 600 may include: one or more NMCs, such as, NMC 602; one or more networks, such as, network 604; one or more file storage locations, such as, file storage 606 or file storage 608; one or more database servers, such as, database 610; one or more FTP servers, such as, FTP server 612; one or more client computers, such as, client computer 614 or client computer 616; one or more network computers, such as, network computer 618; or the like. One of ordinary skill in the art will appreciate that for the innovations disclosed herein anticipate systems that include more or fewer file storage locations or more or fewer entities than described here. Accordingly, for brevity and clarity additional system examples are omitted.

In one or more of the various embodiments, as described above, NMC 602 may be arranged to monitor network traffic that occurs inside one or more networks, such as, network 604 as well as network traffic that enters or exits network 604. Also, for some embodiments NMC 602 may represent one or more NMC devices, one or more NMC services, or the like, that may support one or more observation ports. Also, one of ordinary skill in the art will appreciate that system 600 may include one or more devices/services (not shown) that may forward portions of the network traffic associated with network 604 to NMC 602.

In one or more of the various embodiments, file system locations, such as, file system location 606 or file system location 608 may represent directories, folders, object stores, or the like, that organizations may employ for storing various data. For convenience and brevity data stored in the file system locations may be referred to interchangeably as data or documents. In some embodiments, file system locations may be considered to in one or more of the networks monitored by one or more NMCs.

In some embodiments, file system locations may be provided by one or more file systems. In some embodiments, file systems (or other access management services) may enable organizations to establish access controls, user privileges, access lists, access restrictions, or the like, that may limit or restrict which users may access the documents stored in various file system locations. Likewise, in some embodiments, the access controls, user privileges, access lists, access restrictions, or the like, may limit or restrict the type of actions that may be performed on documents stored in various file system locations. For convenience and brevity these access controls, user privileges, access lists, access restrictions, or the like, may be referred to as access policies.

Also, in some cases, one or more access policies may be automatically enforced by file systems or other security services. In other cases, for some embodiments, one or more access policies may be enforced by user convention rather than being enforced automatically by file systems or other security services. For example, for some embodiments, file system directory 618 may be configured limit access to particular users to protect sensitive data or documents that may be stored within. Accordingly, an access policy that requires particular sensitive documents to be stored in directory 618 may be circumvented or disabled if a user authorized to access directory 618 copies documents from directory 618 to another directory configured with a less secure policy such as directory 620.

For example, if directory 618 is a repository for storing sensitive information, such as, employee personal information, trade secrets, customer lists, security information, or the like, an organization may configure various file system policies for directory 618 that reflect the sensitivity of documents stored within. However, in some cases, one or more authorized users may inadvertently or maliciously circumvent one or more of these access policies by copying documents from a policy compliant file system location to a non-compliant file system location (e.g., a hard drive local to the user). Further, in some cases, access policies may allow temporary or transient relocation of sensitive documents to less sensitive locations. Accordingly, in some cases, sensitive documents may be accidentally left in less secure locations, even though the initial/temporary copying of the documents may be allowed by the access policies.

Accordingly, in one or more of the various embodiments, NMCs, such as, NMC 602 may be arranged to observe network activity to determine if sensitive documents have been moved contrary to access policies. Likewise, in some embodiments, NMCs may be arranged to identify file system locations that may be storing sensitive documents that should be stored elsewhere or under different access policies.

In one or more of the various embodiments, NMCs may be arranged to determine that two or more directories should have similar policies based on the similarity of documents stored within those directories. For example, in some embodiments, NMCs may be arranged to identify similar documents or document types that may be stored in directories configured with different access policies. Thus, for example, an inference that one or more of those directories may be configured incorrectly may be made. Also, in some embodiments, NMCs may be arranged to identify one or more directories that should be protected based on observing the type of documents being stored or accessed. For examples, NMCs may be configured to generate reports that identify one or more directories that may be storing documents that should be protected.

In one or more of the various embodiments, NMCs may be arranged to identify potential data exfiltration based on observing if sensitive documents are copied to FTP servers, removable drives, laptops, or other external facing or publicly accessible locations.

In one or more of the various embodiments, NMCs may be arranged to recommend access policy changes based on observing how data or documents are stored or accessed in a file system. For example, in some embodiments, NMCs may be configured to recommend security improvements to access policies based on observing how sensitive documents are stored or accessed within a monitored networks.

In one or more of the various embodiments, NMCs may be arranged to generate one or more reports, notifications, alerts, logs, or the like, associated with documents or data that may be accessed (or stored) outside of one or more access policies.

In one or more of the various embodiments, NMCs may be arranged to determine document related activity in monitored networks based on various metrics or activity characteristics that may be observed or inferred from the network traffic in monitored networks. In some embodiments, inferences about the observed activity may be generated based on various features of the activity, such as, endpoint identities, request/response asymmetry, comparison with historical activity, communication protocols, application protocols, encryption status, encryption type, directory configuration/policy information, or the like. Further, in some embodiments, NMCs may be arranged to determine one or more features or one or more metrics associated with documents that may be associated with observed activity. Accordingly, in some embodiments, NMCs may be arranged to infer if documents may be sensitive based on observations or metrics, such as, document size, patterns of access, meta-data visible in the network traffic, file system locations, user/session characteristics, content, semantic content, similarities to other documents or associated activity, or the like.

In one or more of the various embodiments, NMCs may be arranged to include one or more summarization engines that may be employed to generate summary profiles that for document activity. In some embodiments, summarization engines may be arranged to employ one or more machine learning models (summarization models) that may be trained to generate summary profiles for documents or document activity. Further, in some embodiments, summary profiles may be arranged to include various information about the access activity associated with the document. Accordingly, in some embodiments, NMCs may be arranged to store summary profiles for further analysis.

In one or more of the various embodiments, NMCs may be configured to focus resources on different portions of the monitored networks, such as, particular network segments, particular file system portions, particular endpoints, particular directories, or the like. In some embodiments, NMCs may be arranged to scan one or more file system locations to identify/evaluate documents that may be stored within. In some embodiments, NMCs may be configured to scan file system locations that may be implicated in abnormal data access based on observed network activity. Thus, in some embodiments, NMCs may limit potentially resource intensive or otherwise intrusive scanning operations to those file system locations that may be suspected of being associated with detected abnormal data access.

Figure 7:
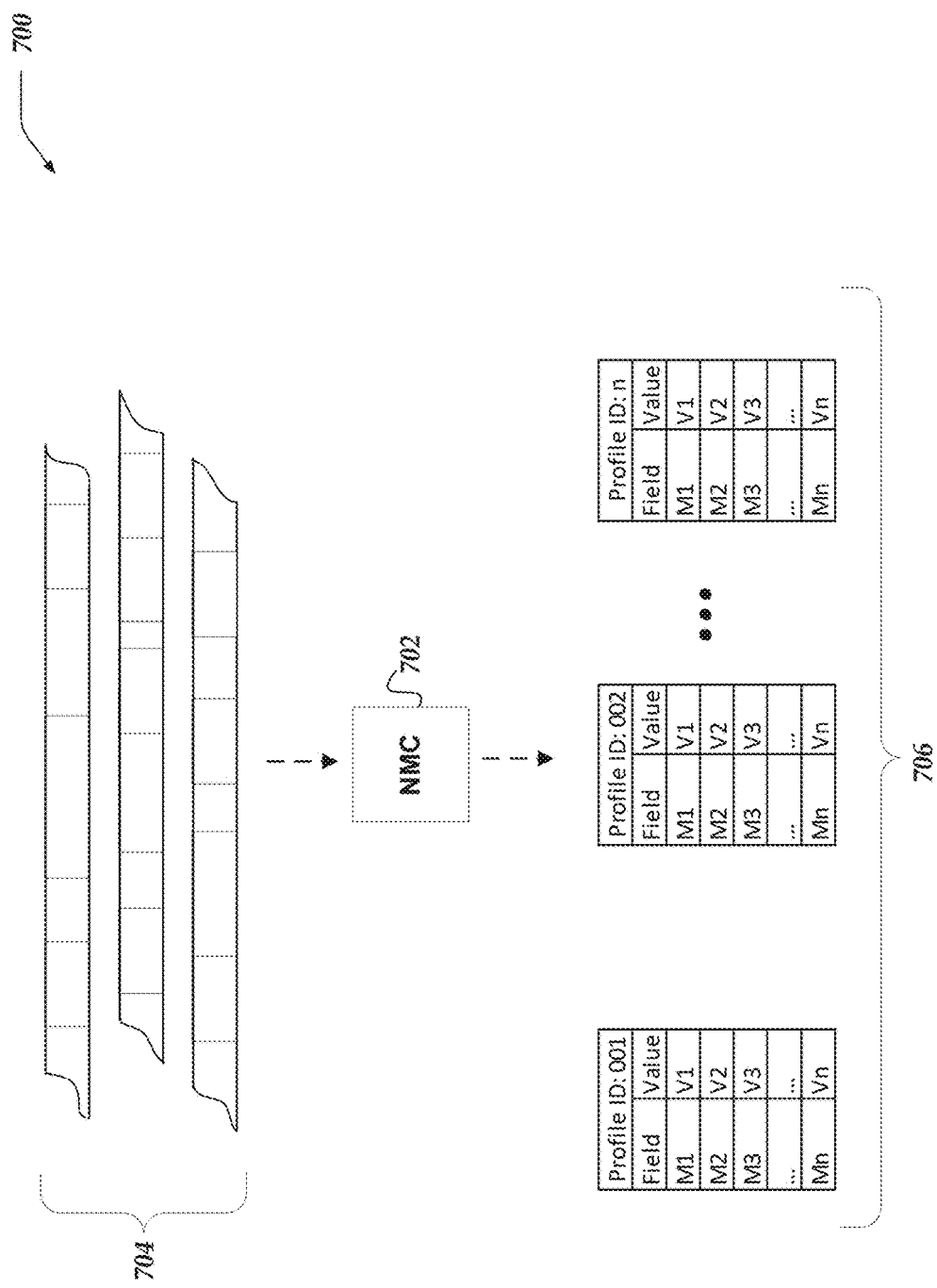
FIG. 7 represents a logical representation of a system for generating metric profiles for detecting abnormal data access based on data similarity in accordance with one or more of the various embodiments.

FIG. 7 represents a logical representation of system 700 for generating metric profiles for detecting abnormal data access based on data similarity in accordance with one or more of the various embodiments. In one or more of the various embodiments, NMC 702 may be arranged to passively monitor network traffic 704. As described, in some embodiments, NMC 702 may be arranged to provide various metrics associated with monitored network traffic 704.

In one or more of the various embodiments, as described above, NMCs such as, NMC 702 may be arranged to collect various metrics from monitored network traffic to include in metric profiles. In one or more of the various embodiments, metric profiles may include one or more collections of fields with values that may be based on network traffic 704 or other metrics associated with network traffic 702. In one or more of the various embodiments, one or more of the metrics included in a metric profile may correspond to metrics collected by the NMC. In other embodiments, one or more of the metrics included in a metric profile may be composite values based on two or more metrics.

Further, in one or more of the various embodiments, metric values included in metric profiles may be normalized to a common schema as well as arithmetically normalized. Normalizing metric values to a common schema may include bucketing values. For example, in some embodiments, observed metrics that have continuous or discrete values may be mapped to named buckets, such as high, medium, low, or the like.

In one or more of the various embodiments, NMCs may be arranged to execute one or more ingestion rules to perform the data normalization required for mapping observed (raw) metrics into metric profile field values. in one or more of the various embodiments, one or more ingestion rules may be built-in to NMCs while other ingestion rules may be provided via configuration information, user input, or the like.

Further, in some embodiments, NMCs may be configured to collect/determine more or fewer metrics depending on configuration information enabling organizations to collect metrics directed to their particular interests or circumstances. Likewise, in some embodiments, NMCs may be configured to employ monitoring techniques that may be passive or intrusive depending on the types of metrics being collected/determined. Accordingly, in some embodiments, NMCs may be configured apply more intrusive monitoring (e.g., packet inspection, document scanning, or the like) in some circumstances and passive non-intrusive monitoring techniques depending on local requirements or local circumstances.

In one or more of the various embodiments, NMCs may be arranged to associate or index metric profiles with one or more objects or entities, such as network flows (or related flows), applications, sessions, users, servers, clients, or the like, depending on the metrics, monitoring techniques, or the like. In some embodiments, NMCs may be arranged to determine objects or entities to associate with metric profiles based on configuration information.

For example, in some embodiments, for detecting abnormal data access based on data similarity, NMCs may associate metric profiles with network activity associated with document access or document related activity.

Figure 8:
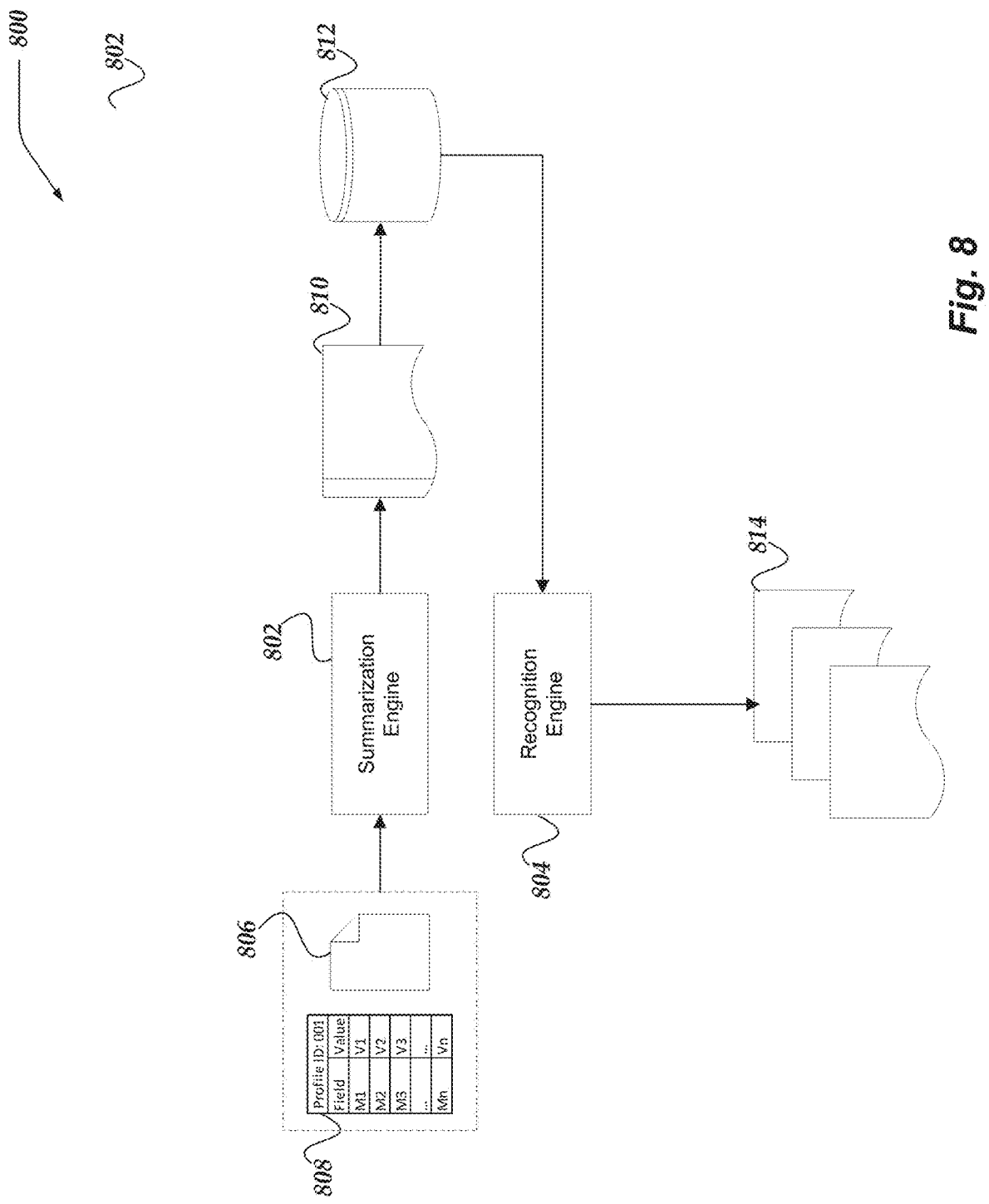
FIG. 8 represents a logical representation of a system for detecting abnormal data access based on data similarity in accordance with one or more of the various embodiments.

FIG. 8 represents a logical representation of system 800 for detecting abnormal data access based on data similarity in accordance with one or more of the various embodiments. In some embodiments, a system for detecting abnormal data access based on data similarity, such as, system 800 may include one or more of: a summarization engine, such as summarization engine 802; a recognition engine, such as, recognition engine 804; a summary data store, such as, summary data store 812; or the like.

In some embodiments, inputs, such as, document 806 or metric profile 808 may be provided to summarization engine 802. Accordingly, in some embodiments, summarization engine 802 may be arranged to generate a summary profile based on document 806, metric profile 808, or the like. In some embodiments, summary profiles, such as, summary profile 810 may be stored in data store 812.

In one or more of the various embodiments, summarization engines may be arranged to employ one or more machine learning models that may be trained to classify documents to determine similarity with other documents or document types. In some embodiments, summarization engines may be provided one or more pre-trained classification models that may be trained to provide summary profiles for documents based on various inputs, such as, metrics, features, characteristics, or the like, that may be associated with the documents being classified.

In one or more of the various embodiments, the particular focus or classifiable features of the machine learning models may vary depending on the local circumstances or local requirements of organizations or users. In some embodiments, classification models may be trained to classify documents into generalized categories, such as, human resources, marketing, sales, business operations, information technology, contracts, or the like. Further, in some cases, for some embodiments, additional classification models may be trained to distinguish between specific types of documents. For example, a general category of documents, such as, human resources, may be further classification into offer letters, employee review information, insurance, misconduct reviews/reports, salary information, vital statistics, or the like.

In one or more of the various embodiments, summary profiles may comprise one or more data structures that represent various features or characteristics of the source documents or data. In some embodiments, summary profiles may include one or more tags, fields, or labels that may correspond to one or more characteristics/features of the source document. In some embodiments, summary profiles may be configured to be provided as inputs to one or more recognition engines.

In one or more of the various embodiments, recognition engines, such as, recognition engine 804 may be arranged to monitor access activity based on the summary profiles stored in data store 812. Accordingly, in some embodiments, if recognition engine 804 identifies access activity deemed to be malicious or otherwise of interest, recognition engine 804 may be arranged to generate one or more reports, such as, report 814 that may include one or more of notifications, alerts, log entries, user interface indicators/alarms, or the like, based on the recognized activity.

In one or more of the various embodiments, recognition engines may be arranged to determine if access activity associated with a document may be anomalous. In some embodiments, anomalous activity may include determining if sensitive documents may be stored in insecure or unauthorized locations. In some cases, for some embodiments, recognition engines may be arranged to recommend one or more access policies for one or more directories. For example, if a recognition engine determines that sensitive information is being regularly stored in less secure locations, a report may recommend modifying the access policies of those locations.

Further, in some embodiments, recognition engines may be arranged to determine anomalous activity by identify similar documents that are being access under different access policies. For example, if NMCs determine that document A (and similar documents) are stored in secure locations, the NMCs may report anomalous activity if it observes documents similar to document A being stored in locations that are less secure.

Similarly, in some embodiments, NMCs may be arranged to identify if documents otherwise similar to secured documents are anomalously moved to out of the monitored networks or otherwise moved to endpoints (e.g., FTP servers, USB drives, or the like) that may enable unauthorized or unexpected exfiltration.

Figure 9:
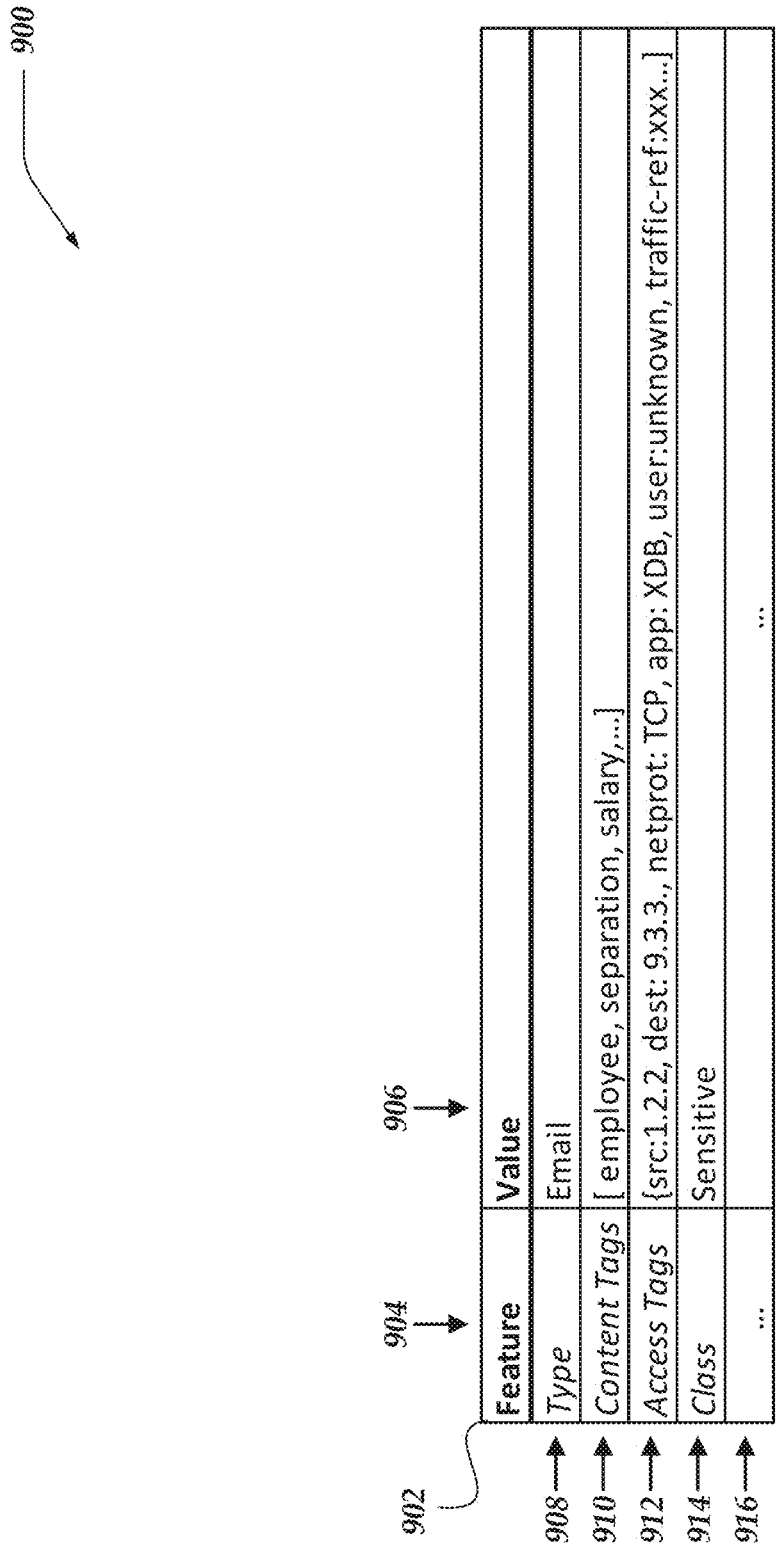
FIG. 9 illustrates a logical schematic of a summary profile for detecting abnormal data access based on data similarity in accordance with one or more of the various embodiments.

FIG. 9 illustrates a logical schematic of summary profile 900 for detecting abnormal data access based on data similarity in accordance with one or more of the various embodiments. As described above, in some embodiments, summarization engines may be arranged to generate summary profiles based on documents and access activity information. In some embodiments, summarization engines may be arranged to provide one or more trained machine learning models that may accept documents, metrics, or access activity as inputs and produce summary profiles corresponding to the documents or document access activity.

In this example, table 902 represent a data structure for a summary profile. In this example, for some embodiments, table 902 may include various columns, such as, column 904 for representing document/access activity feature names and column 906 for representing features values. In this example: row 908 may be considered to correspond to a document type; row 910 may be considered to correspond to content tags that indicate that content types that the summarization engine inferred may be included in the document; row 912 may be considered to represent a collection of fields representing network metrics or access activity; row 914 may be considered to represent a sensitive class for a documents; row 916 may be considered to represent other or additional features that may be available; or the like. Note, while summary profile 900 is represented here using a table-like data structure, one of ordinary skill in the art will appreciate that data structures that may comprise summary profiles are not so limited. In some cases, for some embodiments, summary profiles may be comprised of other types of data structure or data formats.

Further, in some embodiments, the particular features representing in summary profiles may vary depending on various factors including, type of document, type of data, user/organization preferences, visibility of features/metrics, or the like. For example, in some cases, a document may be encrypted such that NMCs or summarization engines may be disabled from observing one or more features. For example, if summarization engines cannot view the content of a document, its summary profile may be limited to include feature values for the features that remain visible to the NMCs or summarization engines.

Further, in some embodiments, summarization engines may be arranged to employ one or more different summarization models to produce different portions (e.g., fields) of the summarization profiles. For example, in some embodiments, summarization model A may be arranged to infer document type while summarization model B may be arranged to generate content tags, and so on. Accordingly, in some embodiments, NMCs may be arranged to employ configuration information to determine the particular summarization models that may be available or employed.

Generalized Operations

FIGS. 10-15 represent generalized operations for detecting abnormal data access based on data similarity in accordance with one or more of the various embodiments. In one or more of the various embodiments, processes 1000, 1100, 1200, 1300, 1400, and 1500 described in conjunction with FIGS. 10-15 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 10-15 may be used for detecting abnormal data access based on data similarity in accordance with at least one of the various embodiments or architectures such as those described in conjunction with FIGS. 4-9. Further, in one or more of the various embodiments, some or all of the actions performed by processes 1000, 1100, 1200, 1300, 1400, and 1500 may be executed in part by network monitoring engine 322, recognition engine 324, summarization engine 326, or the like, running on one or more processors of one or more network computers.

Figure 10:
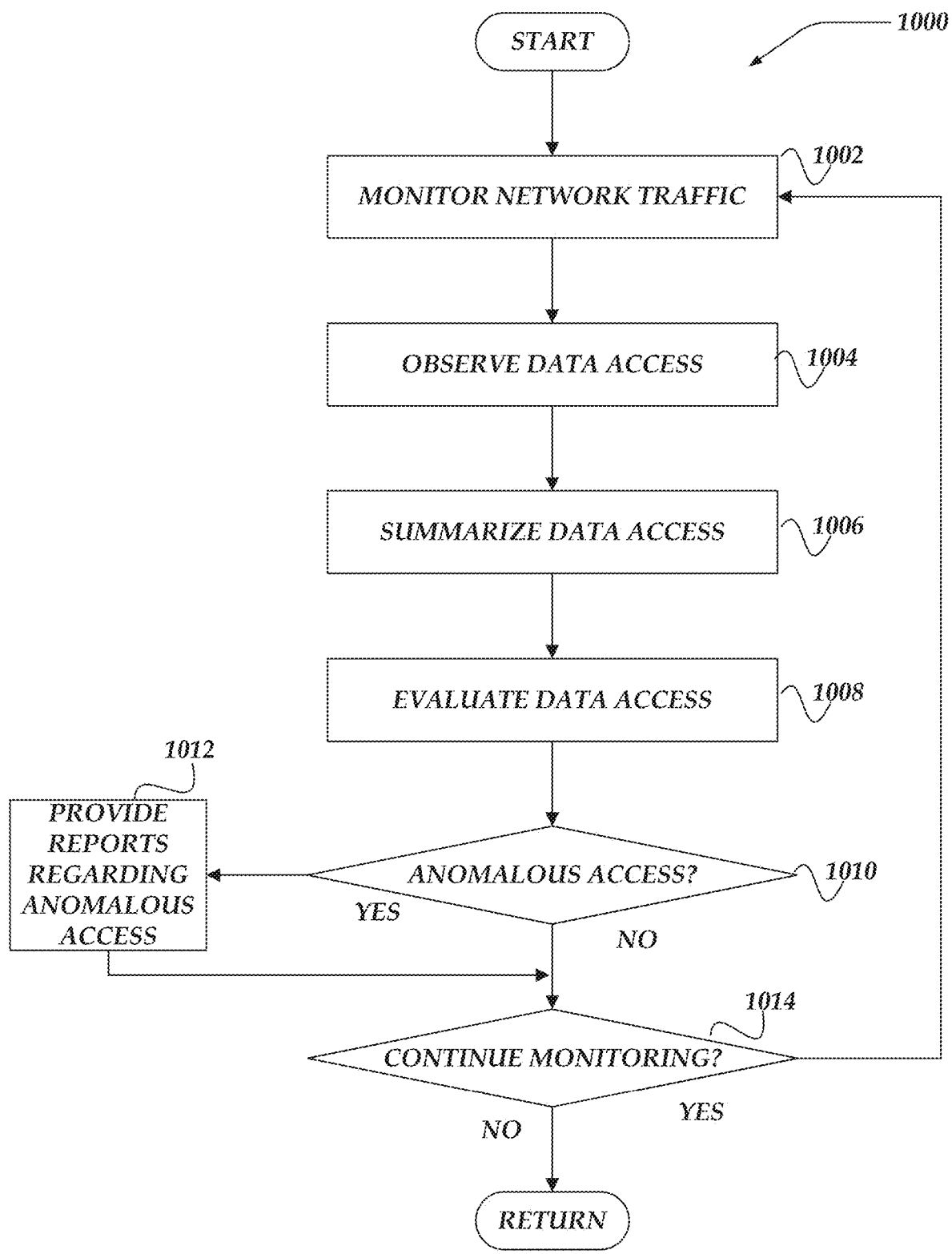
FIG. 10 illustrates an overview flowchart of a process for detecting abnormal data access based on data similarity in accordance with one or more of the various embodiments.

FIG. 10 illustrates an overview flowchart of process 1000 for detecting abnormal data access based on data similarity in accordance with one or more of the various embodiments. After a start block, at block 1002, in one or more of the various embodiments, NMCs may be arranged to monitor network traffic in one or more networks. As described above, NMCs may be arranged to monitor network traffic in a network environment. Accordingly, in some embodiments, NMCs may collect a variety of metrics associated with the one or more flows that comprise network traffic in monitored networks. Further, in some embodiments, NMCs may be arranged to analyze patterns, features, contents, or the like, of network traffic associated with one or more network flows. In some embodiments, NMCs may be arranged to track requests/responses between endpoints to determine the protocols that may be in use or evaluate if the network traffic matches expectations or policies that may be associated with various protocols. Note, as mentioned above, protocols detected or monitored by NMCs may be one or one or more of data-link layer protocols, transport protocols, application protocols, or the like. Accordingly, for brevity or clarity they may be referred to herein as protocols.

At block 1004, in one or more of the various embodiments, NMCs may be arranged monitor or otherwise observe the network activity that may be associated with data or document accesses.

In one or more of the various embodiments, NMCs may be configured recognize network traffic that may be associated with accessing documents. Accordingly, in some embodiments, NMCs may be arranged to examine network traffic to identify communication protocols or application protocols that may be associated with accessing documents. In some cases, this may include identifying network traffic associated with protocols, such as, FTP (File Transfer Protocol), NFS (Network File System), RCP (Remote Copy Protocol), SCP (Secure Copy Protocol), AS2 (Applicability Statement 2), or the like.

Also, in some embodiments, NMCs may be arranged to infer potential document transfers based on previous activity associated with particular endpoints, such as, file servers. Thus, in some embodiments, if the monitored network traffic includes encrypted portions that may be opaque to the NMC, NMCs may continue to infer which network activity that may be associated with documents access based on one or more metrics associated with the network activity, including, source endpoints, target endpoints, request/response patterns, asymmetry in request/response transfer sizes, or the like. Likewise, in some embodiments, NMCs may be provided configuration information that declares one or more file servers as part of defining access policies.

Also, in one or more of the various embodiments, NMCs may be arranged to examine portions of document content or document meta-data that may be determined from the monitored network traffic to determine if documents are being accessed. For example, in some embodiments, document metadata or header fields in some protocols may be employed to infer that network activity may be associated with accessing documents. Thus, in some cases, NMCs may be arranged to collect document features, such as, file format, document size, word count, language, access timestamp (e.g., last read time, creation time, or the like), authors, document titles, or the like.

In one or more of the various embodiments, NMCs may be arranged to collect one or more metrics, network activity features, document features, or the like. Accordingly, in some embodiments, this information as well as one or more network traffic, metric profiles, or the like, may be provided to a summarization engine to determine if the observed network activity may be associated with document access activity. Thus, in some embodiments, summarization engines may be arranged to predict if the observed network activity may be related to document access. For example, in some embodiments, summarization engines may be arranged to employ one or more summarization models to generate summary profiles that represent the observed document access activity. Thus, for example, summarization engines may be arranged to reject/decline observed network activity that cannot be summarized into valid summary profiles. For example, if the information associated with a potential document access cannot be summarized by a summary model, the network activity may be determined to be unassociated with document access.

At block 1006, in one or more of the various embodiments, NMCs may be arranged to summarize the observed network activity that may be associated with data or document accesses.

In one or more of the various embodiments, summarization engines may be arranged to employ one or more summarization models to generate summary profiles that represent document access activity. In some embodiments, summarization models may be trained to recognize documents or document access activity. In some embodiments, the amount of information included in a particular summary profile may vary depending on the type of network activity information. For example, in some embodiments, if the content of the document(s) involved in the document activity includes the unencrypted document content, summarization engines may employ summarization models that may evaluate the semantic meaning of the contents as well as physical features, such as, word count, title, or the like.

In one or more of the various embodiments, if summary profiles may be generated for document access activity, summarization engines may be arranged to store the summary profiles in a data store for future consideration. In some embodiments, summary profiles may reference other information stored in other data stores, such as, captured/archived network packets, system logs, event logs, or the like, that may be correlated with the document accesses.

Further, in some embodiments, summarization engines may be arranged to generate summary profiles that include access policy information about the source directories or target directories. In some embodiments, if access policies may be discoverable, they may be included in summary profiles. For example, in some embodiments, if a source directory is associated with protective access policies, tags or labels representing the access policies may be included in summary profiles.

At block 1008, in one or more of the various embodiments, NMCs may be arranged to evaluate the summarized activity information.

In one or more of the various embodiments, NMCs may be arranged to employ one or more recognition engines to evaluate information in a summary profile data store to determine if the document access may be anomalous.

Accordingly, in some embodiments, recognition engines may be arranged to employ one or more recognition models that may be trained to identify patterns in the summary profiles that indicate the occurrence of anomalous activity.

In one or more of the various embodiments, different recognition models may be provided for different document types. For example, in some embodiments, email documents may be evaluated using different recognition models than word processor documents. Also, in some embodiments, different recognition models may be trained to determine different types of anomalous activity. For example, in some embodiments, one or more recognition models may be trained to classify document movement/copying while other recognition models may be trained to classify document access, such as, document reads, directory listings, or the like.

At decision block 1010, in one or more of the various embodiments, if there may be anomalous activity or accesses, control may flow to block 1012; otherwise, control may flow to decision block 1014.

In one or more of the various embodiments, recognition models may be arranged to generate a recognition result that include a recognition score that indicates a quality of the classification. Accordingly, in some embodiments, if a recognition score exceeds a defined threshold value, recognition engines may determine that the document access activity may be anomalous.

At block 1012, in one or more of the various embodiments, NMCs may be arranged to provide one or more reports regarding the anomalous activity or accesses.

As described above, in some embodiments, reports may include user interface dashboards, notifications, alarms, log entries, or the like. In some embodiments, recognition engines may be configured to provide one or more specific reports to particular users based on configuration information. Further, in some embodiments, recognition engines may be arranged to automatically provide report information to one or more other services via APIs or other interfaces.

At decision block 1014, in one or more of the various embodiments, if the NMC should continue monitoring the network traffic, control may loop back block 1002; otherwise, control may be returned to a calling process.

Figure 11:
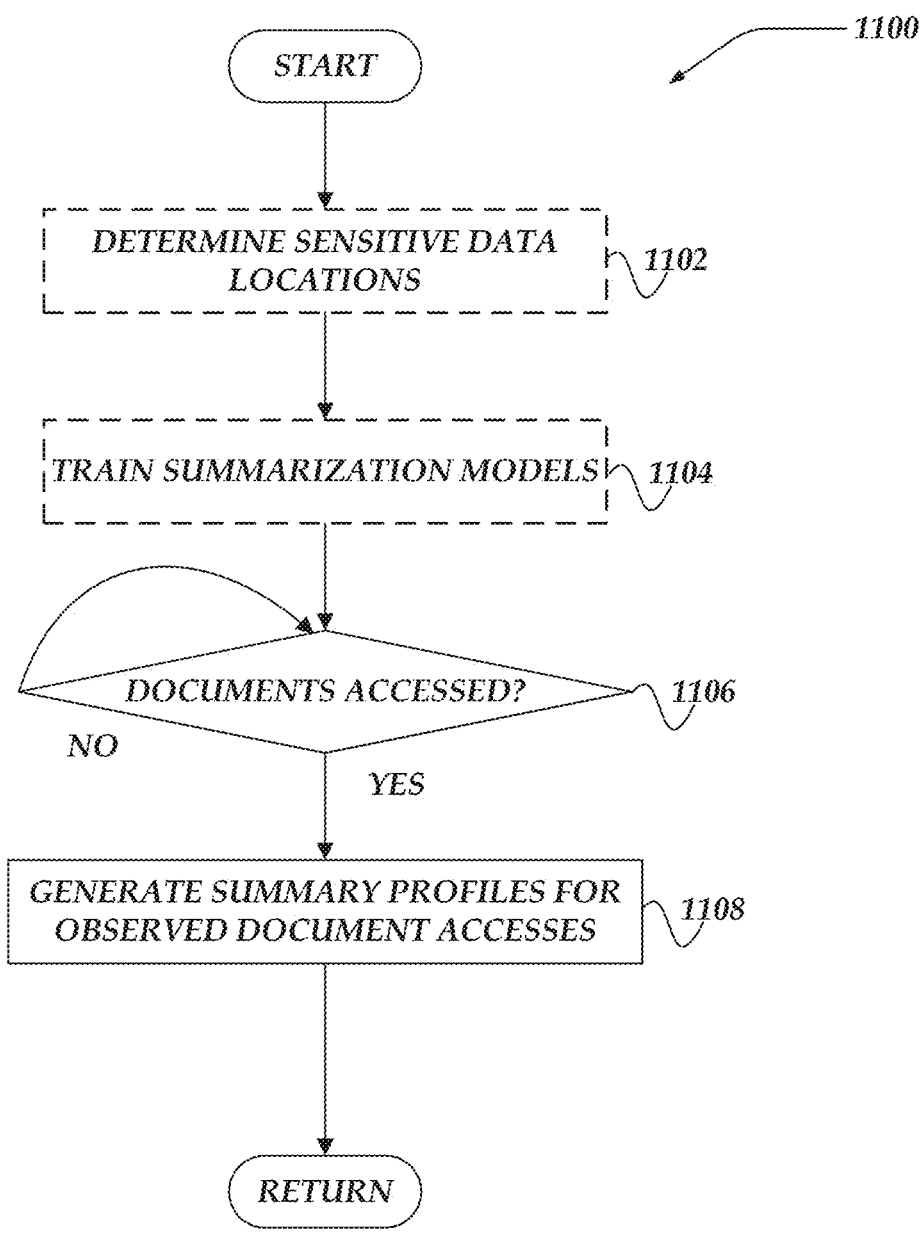
FIG. 11 illustrates a flowchart of a process for detecting abnormal data access based on data similarity in accordance with one or more of the various embodiments.

FIG. 11 illustrates a flowchart of process 1100 for detecting abnormal data access based on data similarity in accordance with one or more of the various embodiments. After a start block, at block 1102, in one or more of the various embodiments, optionally, one or more sensitive data locations may be determined.

In one or more of the various embodiments, NMCs may be arranged to identify one or more locations, such as, servers, file system locations, directories, object stores, or the like, that may store documents. In some embodiments, these locations may be discovered based on observing the network activity associated with a given location. For example, in some embodiments, NMCs may be configured to classify locations that receive many read document requests as being document repositories.

In one or more of the various embodiments, NMCs may be arranged to progressively identify document repositories as a historical record of activity may be developed. For example, in some embodiments, as more information may be discovered about document access activity in a monitored network, NMCs may identify more repositories. In some embodiments, this may enable NMCs to identify unofficial or unsanctioned document repositories that may be otherwise unknown within an organization.

Note, this block is indicated as being optional because in some cases for some embodiments sensitive data locations, such as, particular directories in file systems, sensitive endpoints, sensitive application servers, or the like, may be provided or otherwise predefined via configuration information.

At block 1104, in one or more of the various embodiments, optionally, summarization engines may be arranged to train one or more summarization models. In one or more of the various embodiments, summarization models may be trained to accept information associated with document accesses as input to produce summary profiles. Accordingly, in some embodiments, summarization models that classify documents or document activity may be trained in advance. For example, in some embodiments, one or more summarization models may be trained to classify document types, provide semantic meaning tags/labels, or the like. Also, in some embodiments, summarization models may be trained to predict if a document contains sensitive information that should be protected.

Note, this block is indicated as being optional because in some cases for some embodiments, one or more pre-trained summarization models may be provided.

At decision block 1106, in one or more of the various embodiments, if NMCs determine that documents or data has been accessed, control may flow to block 1108; otherwise, control may loop back to decision block 1106.

At block 1108, in one or more of the various embodiments, summarization engines may be arranged to generate summary profiles for the observed data or documents. As described above, summary profiles may comprise one or more data structures that include information about the document that may have been accessed as well as the network activity associated with the document access.

In one or more of the various embodiments, summarization models may comprise instructions that select or format activity information collected by the NMCs monitoring the networks. In some embodiments, summarization engines may be arranged to employ different summarization models to determine or predict one or more field value for summary profiles. For example, a summarization model may be trained to predict document type while other summarization models may be trained to extract semantic meaning from the content of the documents.

In some cases, for some embodiments, different document access activity may have different access information or document information available. For example, if the NMC may be disabled from decrypting document contents, summarization models that predict semantic meaning may be disabled. Thus, in this example, the corresponding summary profiles may omit semantic meaning predicted from the document content.

In some embodiments, summarization engines may employ multiple summarization models that each may be directed to one or more different summary fields. For example, a first summarization model may be trained to determined document type, other summarization models may be trained to identify subject matter, authorship, document importance/sensitivity, related access policies, type of activity, source of documents, or the like.

In one or more of the various embodiments, summarization engines may be arranged to include or reference network activity information provided by NMC monitoring in summary profiles. For example, in some embodiments, NMC may be arranged to provide a collection of name-value pairs that capture the network information that may be associated with document accesses or related network flows. For example, this type of information may include, timestamps, request/response tuple information, user identifiers, session identifiers, protocol information, packet sizes, or the like. In some embodiments, the available network activity information may vary depending on the activity, network configuration, NMC configuration, or the like. Accordingly, in some embodiments, summarization engines may be arranged to include information that may be available in the generated summary profiles. Accordingly, in some embodiments, some or all of metrics in metric profiles may be included in summary profiles.

In one or more of the various embodiments, summarization engines may be arranged to store summary profiles in a summary profile data store. In some embodiments, summary profile data stores may be configured to index summary profiles based on various fields or features, including time/timestamps, document types, inferred sensitivity, source repository, application types, protocol types, or the like.

Further, in some embodiments, additional summarization models may be added to the system as different document access activity may become of interest. Likewise, in some cases, organizations may have particular documents or document access activity that may be of unique interest which may require dedicated/customized summarization models. Also, in some embodiments, the availability of summarization models may vary depending on licensing considerations or other local circumstances or local requirements. Accordingly, in some embodiments, summarization engines may be arranged to determine available summarization models based on configuration information to account for local circumstances or local requirements. In some cases, this may include registering or installing one or more plugins, extensions, libraries, or the like, that include or provide one or more summarization models.

Next, in one or more of the various embodiments, control may be returned to a calling process.

Figure 12:
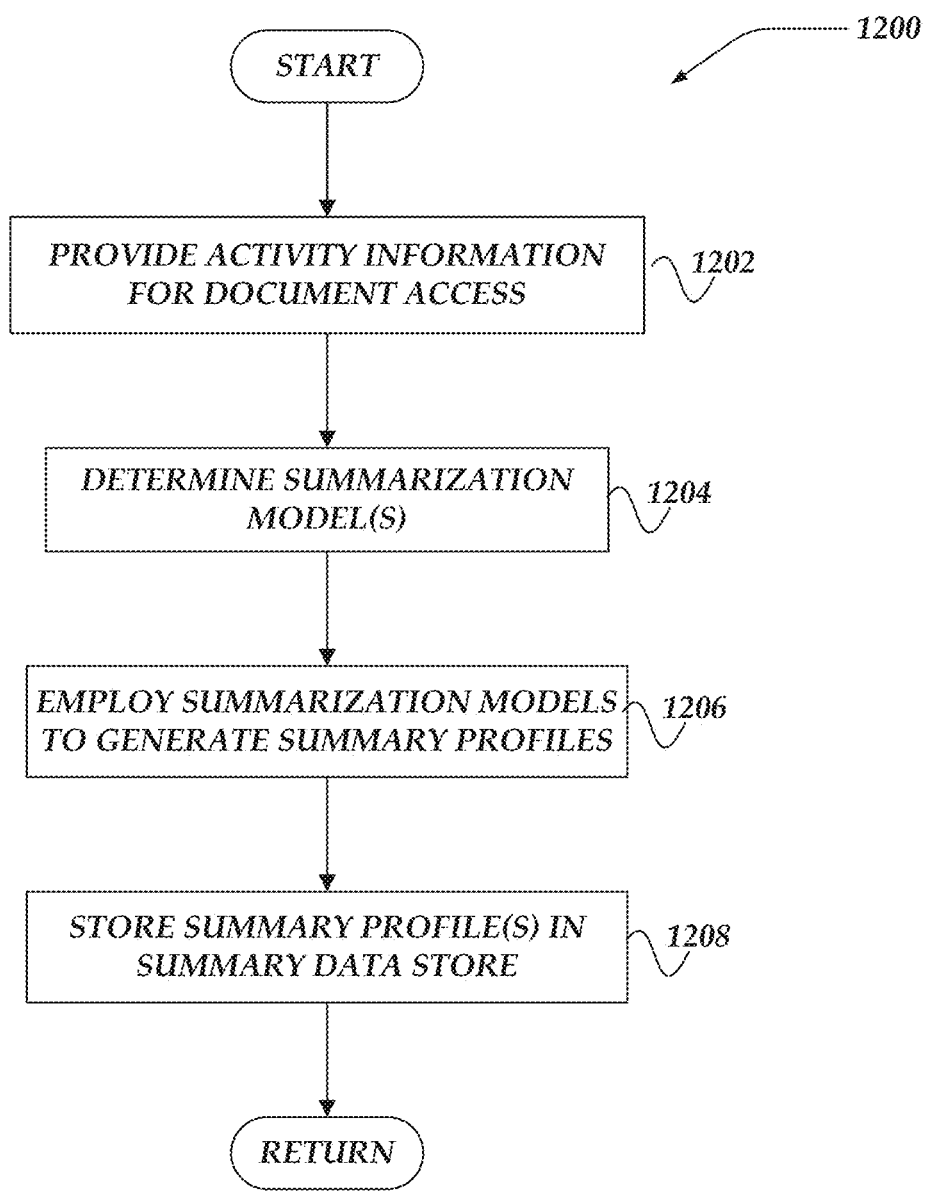
FIG. 12 illustrates a flowchart of a process for detecting abnormal data access based on data similarity in accordance with one or more of the various embodiments.

FIG. 12 illustrates a flowchart of process 1200 for detecting abnormal data access based on data similarity in accordance with one or more of the various embodiments. After a start block, at block 1202, in one or more of the various embodiments, information associated with document access activity may be provided to a summarization engine. As described above, NMCs that monitor network activity in monitored networks may collect a variety of information that may be associated with document access activity, including metric profiles, network traffic, or the like.

In one or more of the various embodiments, NMCs may be arranged to make available information that may be collected from or about one or more network flows or other network activity that may be associated with potential document access activity. In some embodiments, one or more filters, rules, or the like, provided via configuration information may be employed to determine if activity information should be provided to summarization engines. For example, in some embodiments, one or more filters may declare that network activity associated with one or more particular protocols may be excluded from consideration. Likewise, in some embodiments, activity associated with one or more servers, sub-networks, applications, network addresses, or the like, may be excluded from consideration. Also, in some embodiments, summarization models themselves may be configured to determine if the provided network activity may be related to document access activity.

At block 1204, in one or more of the various embodiments, the summarization engine may be arranged to determine one or more summarization models.

In one or more of the various embodiments, summarization models may comprise one or more heuristics, one or more machine learning classifiers, or the like.

In one or more of the various embodiments, summarization engines may be provided more than one summarization model. In some embodiments, one or more summarization models may be directed to different types of documents or different kinds of document activity. Also, in some embodiments, one or more summarization models may directed to generate values for different portions or fields in for summary profiles. Further, in some embodiments, summarization models may be hierarchical such that the results from some summarization models may determine one or more additional summarization models.

At block 1206, in one or more of the various embodiments, the summarization engine may be arranged to employ the summarization models to generate summary profiles associated with the document access activity.

In one or more of the various embodiments, summarization models may be provided activity information as inputs for generating outputs to populate fields in the summary profiles. In some embodiments, some fields in summary profiles may be considered feature vectors, or the like, for one or more dimensions used to classify the document access activity. For example, in some embodiments, a summarization model may be arranged to generate a set of semantic tags for a document associated with document access activity. While, for example, another summarization model may generate a vector-like collection of other features representative of the document or document activity.

In some cases, one or more summarization models may be disabled from provide fields for a summary profile if the input information required for that summarization model may be unavailable. For example, if summarization model A is trained to extract semantic information from the content of documents, if document contents are unavailable (e.g., encrypted), fields or values corresponding to summarization model A may be omitted from summary profiles.

In one or more of the various embodiments, summarization engines may be arranged to include information for looking up additional information related to the document activity, such as, document source (e.g., path information), document destination, activity timestamps, user identities, or the like.

At block 1208, in one or more of the various embodiments, the summarization engine may be arranged to store generated summary profiles in a summary profile data store.

In one or more of the various embodiments, summary profiles may be stored and indexed such that recognition engines may enabled provide queries to retrieve one or more summary profiles from the data store. In some embodiments, summary profiles may be indexed based on time of creation, start time of activity, stop time of activity, document type, source, destination, or the like. In some cases, additional indexes in summary profile data stores may be created to support one or more recognition models. For example: one recognition model may request all summary profiles within a time range; another recognition model may request summary profiles associated with a particular document type; and still another recognition model may request summary profiles originating from the same repository; or the like.

Next, in one or more of the various embodiments, control may be returned to a calling process.

Figure 13:
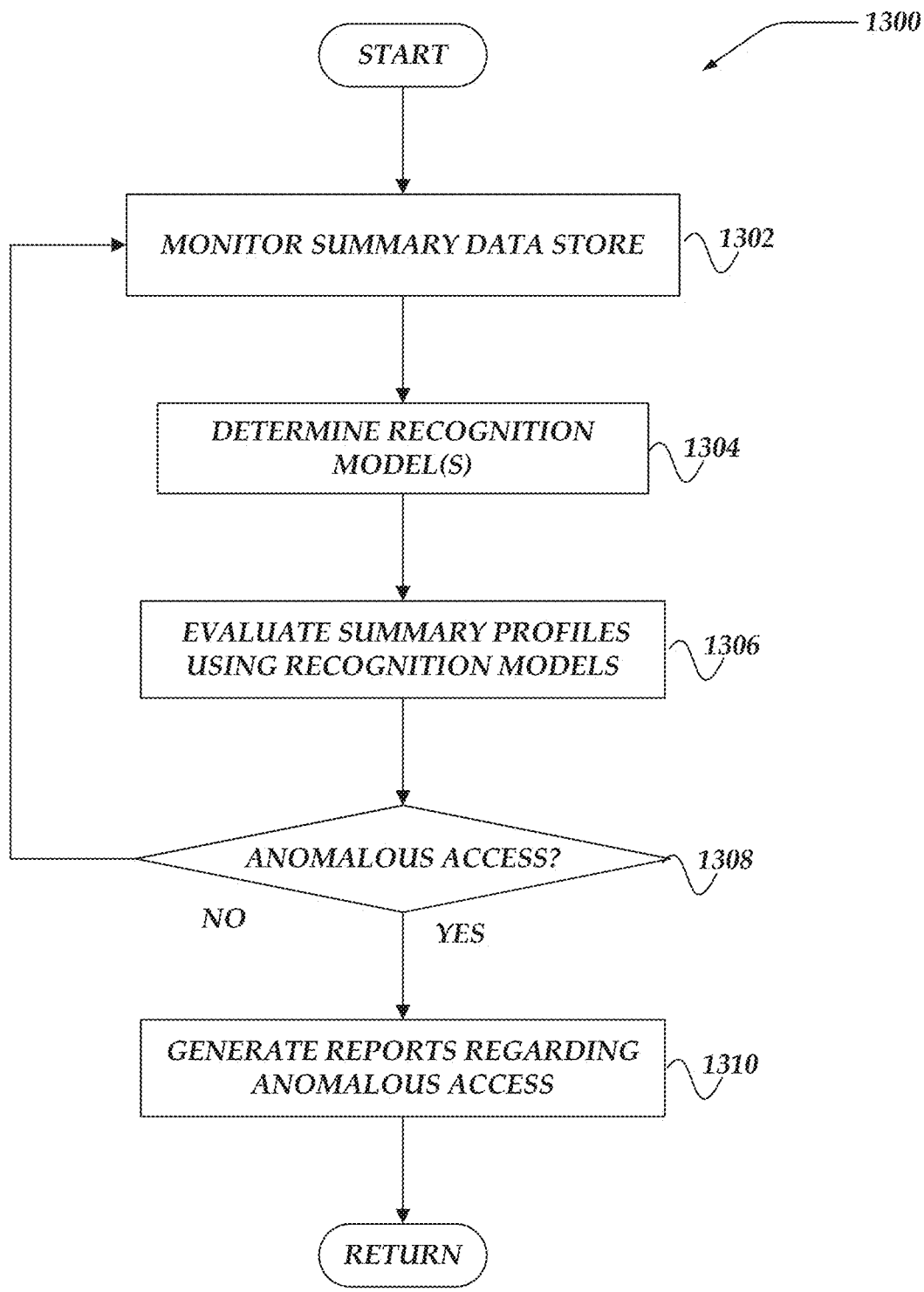
FIG. 13 illustrates a flowchart of a process for detecting abnormal data access based on data similarity in accordance with one or more of the various embodiments.

FIG. 13 illustrates a flowchart of process 1300 for detecting abnormal data access based on data similarity in accordance with one or more of the various embodiments. After a start block, at block 1302, in one or more of the various embodiments, recognition engines may be arranged to monitor one or more summary profile data stores. In some embodiments, recognition engines may be arranged to activate if new summary profiles are added to data stores. Likewise, in some embodiments, recognition engines may be arranged to periodically examine summary profile data stores to determine if new summary profiles have been added.

At block 1304, in one or more of the various embodiments, recognition engines may be arranged to determined one or more recognition models.

In one or more of the various embodiments, recognition models may comprise one or more heuristics, one or more machine learning classifiers, or the like.

In one or more of the various embodiments, recognition engines may be provided more than one recognition model. In some embodiments, one or more recognition models may directed to different types of documents or different kinds of document activity. Also, in some embodiments, one or more recognition models may directed to evaluate different portions or fields of the summary profiles. Further, in some embodiments, recognition models may be hierarchical such that the results from some summarization models may determine additional recognition models.

At block 1306, in one or more of the various embodiments, recognition engines may be arranged to evaluate one or more summary profiles using the one or more recognition models. In one or more of the various embodiments, recognition engines may be arranged to query summary profile data stores for one or more summary profiles that may be relevant to a given recognition model. For example, in some embodiments, some recognition models may be arranged to examine summary profiles that occur within a time range, a sequence of summary profiles, summary profiles for particular document types, summary profiles that include particular content tags, or the like.

In some embodiments, one or more recognition models may be arranged to evaluate summary profiles to determine based on their similarity of document features, network activity features, document activity, or the like. Accordingly, in some embodiments, recognition engines may be arranged to summary profiles based on one or more similarities in document features, activity features, or combination thereof.

In one or more of the various embodiments, one or more recognition models may be arranged to infer document storage locations based on the summary profile information. In some embodiments, conventional machine learning training may be used to train one or more recognition models to infer the existence of document locations based on various criteria. For example, in some embodiments, a recognition model may be trained or configured to classify entities or locations in the network as document locations if those entities or locations may be associated with outbound document traffic. For example, in some embodiments, recognition models may be trained or configured to infer document locations of interest based on various patterns of activity, such as, network traffic, access activity, number of unique requesting clients, or the like.

At decision block 1308, in one or more of the various embodiments, if the document access activity may be anomalous, control may flow to block 1310; otherwise, control may loop back to block 1302.

In some embodiments, recognition engines may be arranged to employ the one or more recognition models to determine if document access activity may be anomalous. For example, for some embodiments, summary profiles with similar document features may be expected to have similar network activity features. Thus, for example, if one summary profile with similar document features has different network activity than its peer summary profiles, it may represent anomalous document activity.

Next, in one or more of the various embodiments, control may be returned to a calling process.

Figure 14:
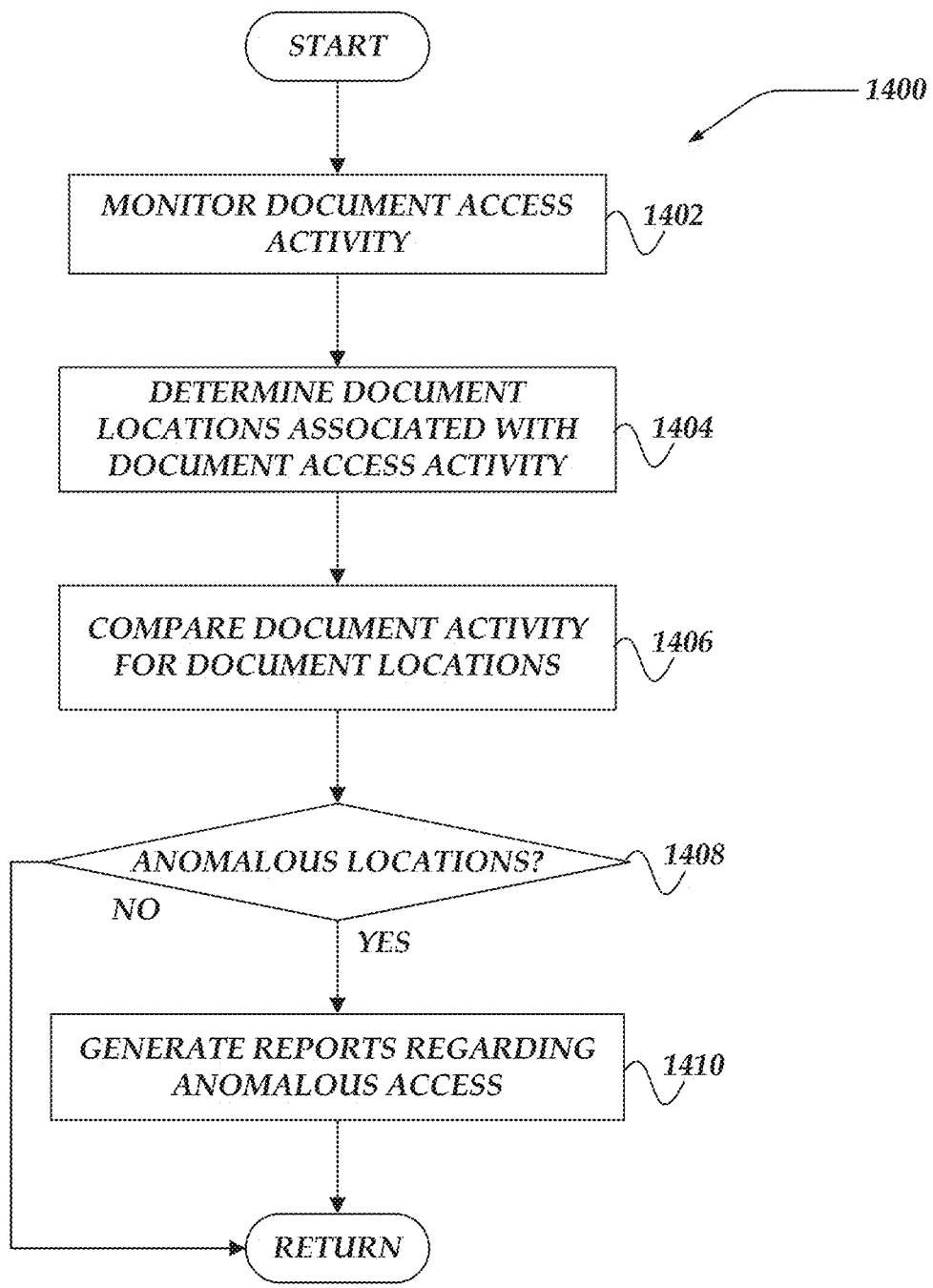
FIG. 14 illustrates a flowchart of a process for detecting abnormal data access based on data similarity in accordance with one or more of the various embodiments.

FIG. 14 illustrates a flowchart of process 1400 for detecting abnormal data access based on data similarity in accordance with one or more of the various embodiments. After a start block, at block 1402, in one or more of the various embodiments, NMCs may be arranged to monitor network traffic or other activity that may be associated with document access activity. As described above, NMCs may be arranged to passively of actively monitor network traffic or other network that may occur in one or more monitored networks. Accordingly, in some embodiments, NMCs may be arranged to determine one or more portions of the monitored activity that may be associated with document access activity.

At block 1404, in one or more of the various embodiments, NMCs may be arranged to determine one or more document locations based on the observed document access activity. In one or more of the various embodiments, NMCs may be arranged to classify network activity or document access activity to infer one or more document locations that may be of interest.

For example, in some embodiments, NMCs may determine locations, such as, servers, distributed file system nodes, network file system directories, shared folders, object stores, or the like, by determining that multiple clients may sending document access related requests and receiving document access related responses from particular endpoint in the monitored networks.

In some embodiments, NMCs may be arranged to employ one or more classifiers, rule-sets, heuristics, or the like, to infer if an endpoint may be a file system location of interest. For example, for some embodiments, locations that may be observed receiving a number of document access requests that exceed a threshold value may be determined to document locations that may be of interest. Likewise, for example, NMCs may be configured to determine that a document location may be interest based on one or more features of the document access activity or one or more features of the involved documents. In some embodiments, NMCs may be arranged to enable organizations or users to customize the features or activity that may be employed to classify document locations as being of interest. Accordingly, in some embodiments, NMCs may be arranged to employ configuration information to determine the criteria for classifying document locations as being of interest to account for local circumstances or local requirements.

In one or more of the various embodiments, NMCs may be arranged to integrate with one or more file system management systems, access control systems, or the like, to determine document location of interest. For example, in some embodiments, file system management systems, access control systems, or the like, may provide one or more interfaces that enable NMCs to determine critical document locations based on querying or otherwise interrogating such systems. Also, in some cases, organization may provide configuration information to NMCs in advance to identity critical document locations.

In one or more of the various embodiments, as described above, NMCs may be arranged to employ summarization engines to generate summary profiles that encapsulate a representation of the observed document access activity.

Accordingly, as described above, in some embodiments, NMCs may be arranged to employ recognition engines and one or more recognition models to review summary profiles to determine document locations that may be of interest. For example, in some embodiments, recognition engines may be arranged to determine document locations based on the multiple summary profiles that indicate the entity that may be providing documents to multiple requesting clients. Also, for example, in some embodiments, one or more recognition models may be trained to identify sensitive or importance document locations based on classifying the contents of documents, user roles of accessing users, or the like.

At block 1406, in one or more of the various embodiments, NMCs may be arranged to compare the document activity across the one or more document locations. In one or more of the various embodiments, NMCs may be arranged to employ recognition engines to identify documents that may be associated anomalous access activity by comparing the activity associated with similar documents. Accordingly, in some embodiments, recognition engines may employ one or more recognition models that may be configured or trained to identify summary profiles associated with document that are similar. Accordingly, in some embodiments, the access activity associated with similar documents may be expected to be similar especially for sensitive or restricted document types.

In one or more of the various embodiments, employing one or more trained machine learning based recognition models to infer similarity enable recognition engines to identify similar documents using 'fuzzy' inferences that strict pattern matching or key word matching may miss. Also, in some embodiments, machine learning trained recognition models may enable the determination of similar documents that may otherwise appear to be dissimilar documents on the surface. Note, in some embodiments, recognition models used for determining similarity may be trained in advance using conventional machine learning practices. Thus, in some cases, the meaning of 'similarity' may vary depending on the training or configuration of the particular recognition models being employed.

Further, in some cases, in some embodiments, recognition engines or recognition models themselves may employ filters, pattern matching (e.g., regular expressions), key word tests, or the like, in conjunction with machine learning trained classifiers. In some embodiments, recognition engines may be configured to employ one or more regular expressions or key word matches to exclude or include one or more documents or summary profiles from consideration. For example, a NMC may be configured by a user to exclude one or more document locations from monitoring. Thus, in some embodiments, a recognition engine may enforce this exclusion by disregarding summary profiles associated with the excluded locations.

At decision block 1408, in one or more of the various embodiments, if anomalous locations or anomalous activity may be determined, control may flow to block 1410; otherwise, control may be returned to a calling process.

At block 1410, in one or more of the various embodiments, NMCs may be arranged to generate one or more reports that include information associated with the anomalous access activity.

Next, in one or more of the various embodiments, control may be returned to a calling process.

Figure 15:
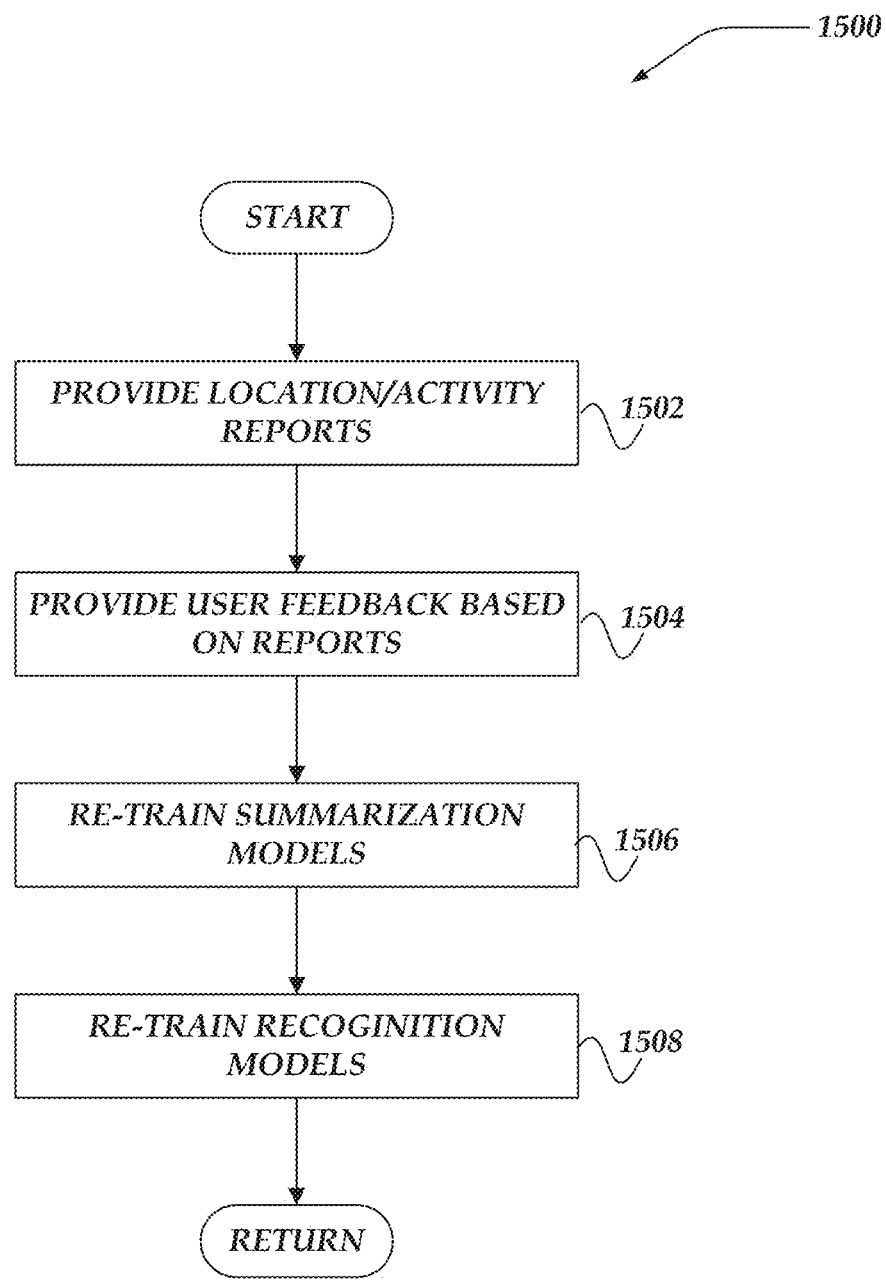
FIG. 15 illustrates a flowchart of a process for detecting abnormal data access based on data similarity in accordance with one or more of the various embodiments.

FIG. 15 illustrates a flowchart of process 1500 for detecting abnormal data access based on data similarity in accordance with one or more of the various embodiments. After a start block, at block 1502, in one or more of the various embodiments, NMCs may be arranged to provide one or more access/activity reports. As described above, NMCs or recognition engines may be arranged to generate one or more reports that include information about abnormal or anomalous data access activity. In some cases, for some embodiments, one or more reports may include interactive user interfaces that enable users to grade or rate the quality of the reported anomalies. For example, in some embodiments, reports may include an interactive list of access events or access activity that recognition models flagged as anomalous. In some embodiments, such user interfaces may include user interface controls that enable users to indicate agreement or disagreement with the inference that access activity may be anomalous.

At block 1504, in one or more of the various embodiments, NMCs may be arranged to collect user feedback based on the one or more reports. In some embodiments, NMCs may be arranged to collect user feedback related to the quality of the inferences provided by recognition engines. In some embodiments, recognition engines may be arranged to provide purpose-built survey user interface to a sampling of users. In other embodiments, one or more reports may include user interfaces that enable users to submit feedback. Further, in some embodiments, users may manually collect feedback associated the one or more reports.

At block 1506, in one or more of the various embodiments, summarization engines may be arranged to retrain one or more summarization models.

In one or more of the various embodiments, NMCs may be arranged to employ the feedback provided by users to determine if one or more summarization models may remain fit-for-purpose or require retraining. Thus, for example, in some embodiments, if a quality score associated with a summarization model falls below a defined threshold value, NMCs may determine the summarization model may be eligible for retraining or discarding.

In some embodiments, summarization engines may be arranged to enable users to configure one or more rules or filters to exclude one or more documents from consideration. For example, for some embodiments, a user may configure summarization engines to disregard email documents that are not associated with attachments. Likewise, in some cases, one or more directories, applications, users, or the like, may be excluded from consideration. Also, in some embodiments, one or more directories, applications, users, or the like, may be manually indicated as sensitive or otherwise requiring additional scrutiny or protection.

For example, in some embodiments, a directory that includes documents that otherwise would appear normal (non-sensitive) may be configured to indicate that documents stored in the directory should be considered sensitive regardless of their content or features.

In one or more of the various embodiments, additional reasons for retraining summarization models may include an increasing number of unclassifiable documents. For example, in some cases, existing summarization model may fail to classify one or more new types or classes of documents or document content. Accordingly, in some embodiments, if the number of unclassified documents exceeds a defined threshold value or percentage, summarization engines may be arranged to train new summarization model for the new documents. In some embodiments, summarization engines may be arranged to provide notifications or alerts that the number of unclassified documents may exceed the threshold values enabling users to train new summarization models.

At block 1508, in one or more of the various embodiments, recognition engines may be arranged to retrain one or more recognition models. Similar to summarization models, recognition engines may be arranged to evaluate if one or more recognition models should be retrained or discarded based on user feedback.

Next, in one or more of the various embodiments, control may be returned to a calling process.

Note, in one or more of the various embodiments, in some cases, summarization engines or recognition engines may be arranged to automatically retrain summarization models or recognition models according to defined schedules or other conditions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for monitoring network traffic in a network using one or more processors that are configured to execute instructions, wherein the execution of the instructions performs actions, comprising:

determining activity associated with accessing a document in the network or a file system based on the monitored network traffic, wherein one or more summarization models are trained to determine one or more values that summarize one or more characteristics of the activity associated with the document access;

generating a profile based on a summarization of the activity associated with the document access, wherein the profile is stored in a data store that stores one or more other profiles that are based on other activity associated with accessing one or more other documents;

determining two or more similar profiles based on a classification of each profile in the data store based on one or more similarities between the profile and the one or more other profiles in the data store;

employing the two or more similar profiles to determine one or more locations in the network associated with two or more documents that correspond to the two or more similar profiles based on the two or more similar profiles, wherein one or more of a known document repository or an unknown document repository at the one or more locations are progressively identified based on heuristics of the activity;

classifying the one or more locations based on the activity, the two or more similar profiles, and one or more access policies associated with each location, wherein the activity associated with accessing the document is classified as inconsistent based on the other activity associated with accessing the one or more other documents and the other activity includes one or more of a different access policy or another location that is less secure than the one or more locations;

employing one or more portions of the one or more locations that are classified as inconsistent with the one or more access policies to generate one or more reports that include information associated with one or more of the document, the activity, or the one or more locations classified as being inconsistent with the one or more access policies; and employing each quality score associated with each summarization model that is below a threshold value to initiate retraining of one or more portions of the one or more summarization models, wherein the retraining employs user feedback and one or more rules for an exclusion or an inclusion of a document type, a directory, or an application that are associated with document access activity.

2. The method of claim 1, wherein generating the profile, further comprises:
employing the one or more summarization models to generate the one or more values that summarize the one or more characteristics the activity associated with the document access, wherein the one or more characteristics include one or more of document sizes, patterns of access, meta-data visible in the network traffic, file system locations, user/session characteristics, content, semantic content, or similarities to other documents or associated activity; and
including the one or more values in the profile.

3. The method of claim 1, wherein determining the two or more similar profiles, further comprises:
providing one or more recognition models that are trained to recognize similarities between the profile and the one or more other profiles;
providing the profile and the one or more other profiles from the data store to the one or more recognition models; and
determining the two or more similar profiles based on the one or more recognition models.

4. The method of claim 1, wherein classifying the one or more locations based on the activity further comprises:
determining a source location where the document is stored based on the activity associated with the document access;
determining one or more target locations where the document is stored as a result of the activity associated with the document access; and
comparing a first access policy that is associated with the one or more source locations with a second access policy that is associated with the one or more target locations.

5. The method of claim 1, wherein classifying the one or more locations, further comprises:
determining one or more characteristics of the document based on the profile; and
further classifying the one or more locations based on the one or more characteristics of the documents, wherein the one or more classified locations include one or more of a local directory in the file system, a shared directory in the file system, a removeable media storage device, or a File Transfer Protocol (FTP) server, or an object store in a cloud computing environment.

6. The method of claim 1, wherein determining the one or more locations in the network, further comprises:
determining one or more access requests based on the monitored network traffic; and
determining the one or more locations based on a number of the access requests exceeding a threshold value.

7. The method of claim 1, wherein classifying the one or more locations in the network, further comprises:
determining one or more sensitive documents based on the monitored network traffic, wherein the one or more sensitive documents include one or more of a human resources document, a sales list, a customer list, or a trade secret; and
further classifying the one or more locations based on an association with the one or more sensitive documents.

8. The method of claim 1, wherein the document or the one or more other documents comprise structured or unstructured data stored in an accessible format, and wherein the accessible format includes, one or more of file formats, database rows, database dumps, backup archives, log files, Software-as-a-Service storage services, and Representational State Transfer Application programming interfaces (REST API) responses.

9. A system for monitoring network traffic in a network:
one or more network monitoring computers (NMCs), comprising:
a memory that stores at least instructions; and
one or more processors that execute instructions that are configured to cause performance of actions, including:
determining activity associated with accessing a document in the network or a file system based on the monitored network traffic, wherein one or more summarization models are trained to determine one or more values that summarize one or more characteristics of the activity associated with the document access;
generating a profile based on a summarization of the activity associated with the document access, wherein the profile is stored in a data store that stores one or more other profiles that are based on other activity associated with accessing one or more other documents;

determining two or more similar profiles based on a classification of each profile in the data store based on one or more similarities between the profile and the one or more other profiles in the data store;

employing the two or more similar profiles to determine one or more locations in the network associated with two or more documents that correspond to the two or more similar profiles based on the two or more similar profiles, wherein one or more of a known document repository or an unknown document repository at the one or more locations are progressively identified based on heuristics of the activity;

classifying the one or more locations based on the activity, the two or more similar profiles, and one or more access policies associated with each location, wherein the activity associated with accessing the document is classified as inconsistent based on the other activity associated with accessing the one or more other documents and the other activity includes one or more of a different access policy or another location that is less secure than the one or more locations;

employing one or more portions of the one or more locations that are classified as inconsistent with the one or more access policies to generate one or more reports that include information associated with one or more of the document, the activity, or the one or more locations classified as being inconsistent with the one or more access policies; and employing each quality score associated with each summarization model that is below a threshold value to initiate retraining of one or more portions of the one or more summarization models, wherein the retraining employs user feedback and one or more rules for an exclusion or an inclusion of a document type, a directory, or an application that are associated with document access activity; and one or more client computers, comprising:
a memory that stores at least instructions; and
one or more processors that execute instructions that are configured to cause performance of actions, including:
providing one or more portions of the network traffic.

10. The system of claim 9, wherein generating the profile, further comprises:
employing the one or more summarization models to generate the one or more values that summarize the one or more characteristics the activity associated with the document access, wherein the one or more characteristics include one or more of document sizes, patterns of access, meta-data visible in the network traffic, file system locations, user/session characteristics, content, semantic content, or similarities to other documents or associated activity; and
including the one or more values in the profile.

11. The system of claim 9, wherein determining the two or more similar profiles, further comprises:
providing one or more recognition models that are trained to recognize similarities between the profile and the one or more other profiles;
providing the profile and the one or more other profiles from the data store to the one or more recognition models; and
determining the two or more similar profiles based on the one or more recognition models.

12. The system of claim 9, wherein classifying the one or more locations based on the activity further comprises:
determining a source location where the document is stored based on the activity associated with the document access;
determining one or more target locations where the document is stored as a result of the activity associated with the document access; and
comparing a first access policy that is associated with the one or more source locations with a second access policy that is associated with the one or more target locations.

13. The system of claim 9, wherein classifying the one or more locations, further comprises:
determining one or more characteristics of the document based on the profile; and
further classifying the one or more locations based on the one or more characteristics of the documents, wherein the one or more classified locations include one or more of a local directory in the file system, a shared directory in the file system, a removeable media storage device, or a File Transfer Protocol (FTP) server, or an object store in a cloud computing environment.

14. The system of claim 9, wherein determining the one or more locations in the network, further comprises:
determining one or more access requests based on the monitored network traffic; and
determining the one or more locations based on a number of the access requests exceeding a threshold value.

15. The system of claim 9, wherein classifying the one or more locations in the network, further comprises:
determining one or more sensitive documents based on the monitored network traffic, wherein the one or more sensitive documents include one or more of a human resources document, a sales list, a customer list, or a trade secret; and
further classifying the one or more locations based on an association with the one or more sensitive documents.

16. The system of claim 9, wherein the document or the one or more other documents comprise structured or unstructured data stored in an accessible format, and wherein the accessible format includes, one or more of file formats, database rows, database dumps, backup archives, log files, Software-as-a-Service storage services, and Representational State Transfer Application programming interfaces (REST API) responses.

17. A network monitoring computer (NMC) for monitoring network traffic between one or more computers, comprising:
one or more processors that execute instructions that are configured to cause performance of actions, including:
determining activity associated with accessing a document in the network or a file system based on the monitored network traffic, wherein one or more summarization models are trained to determine one or more values that summarize one or more characteristics of the activity associated with the document access;
generating a profile based on a summarization of the activity associated with the document access, wherein the profile is stored in a data store that stores one or more other profiles that are based on other activity associated with accessing one or more other documents;

determining two or more similar profiles based on a classification of each profile in the data store based on one or more similarities between the profile and the one or more other profiles in the data store;

employing the two or more similar profiles to determine one or more locations in the network associated with two or more documents that correspond to the two or more similar profiles based on the two or more similar profiles, wherein one or more of a known document repository or an unknown document repository at the one or more locations are progressively identified based on heuristics of the activity;

classifying the one or more locations based on the activity, the two or more similar profiles, and one or more access policies associated with each location, wherein the activity associated with accessing the document is classified as inconsistent based on the other activity associated with accessing the one or more other documents and the other activity includes one or more of a different access policy or another location that is less secure than the one or more locations;

employing one or more portions of the one or more locations that are classified as inconsistent with the one or more access policies to generate one or more reports that include information associated with one or more of the document, the activity, or the one or more locations classified as being inconsistent with the one or more access policies; and employing each quality score associated with each summarization model that is below a threshold value to initiate retraining of one or more portions of the one or more summarization models, wherein the retraining employs user feedback and one or more rules for an exclusion or an inclusion of a document type, a directory, or an application that are associated with document access activity.

18. The NMC of claim 17, wherein generating the profile, further comprises:

employing the one or more summarization models to generate the one or more values that summarize the one or more characteristics the activity associated with the document access, wherein the one or more characteristics include one or more of document sizes, patterns of access, meta-data visible in the network traffic, file system locations, user/session characteristics, content, semantic content, or similarities to other documents or associated activity; and including the one or more values in the profile.

19. The NMC of claim 17, wherein determining the two or more similar profiles, further comprises:

providing one or more recognition models that are trained to recognize similarities between the profile and the one or more other profiles;

providing the profile and the one or more other profiles from the data store to the one or more recognition models; and determining the two or more similar profiles based on the one or more recognition models.

20. The NMC of claim 17, wherein classifying the one or more locations based on the activity further comprises:

determining a source location where the document is stored based on the activity associated with the document access;

determining one or more target locations where the document is stored as a result of the activity associated with the document access; and comparing a first access policy that is associated with the one or more source locations with a second access policy that is associated with the one or more target locations.

21. The NMC of claim 17, wherein classifying the one or more locations, further comprises:

determining one or more characteristics of the document based on the profile; and further classifying the one or more locations based on the one or more characteristics of the documents, wherein the one or more classified locations include one or more of a local directory in the file system, a shared directory in the file system, a removeable media storage device, or a File Transfer Protocol (FTP) server, or an object store in a cloud computing environment.

22. The NMC of claim 17, wherein determining the one or more locations in the network, further comprises:

determining one or more access requests based on the monitored network traffic; and determining the one or more locations based on a number of the access requests exceeding a threshold value.

23. The NMC of claim 17, wherein classifying the one or more locations in the network, further comprises:

determining one or more sensitive documents based on the monitored network traffic, wherein the one or more sensitive documents include one or more of a human resources document, a sales list, a customer list, or a trade secret; and further classifying the one or more locations based on an association with the one or more sensitive documents.

24. A processor readable non-transitory storage media that includes instructions for monitoring network traffic using one or more network monitoring computers, wherein execution of the instructions, by the one or more networking monitoring computers, are configured to cause performance of the method comprising:

determining activity associated with accessing a document in the network or a file system based on the monitored network traffic, wherein one or more summarization models are trained to determine one or more values that summarize one or more characteristics of the activity associated with the document access;

generating a profile based on a summarization of the activity associated with the document access, wherein the profile is stored in a data store that stores one or more other profiles that are based on other activity associated with accessing one or more other documents;

determining two or more similar profiles based on a classification of each profile in the data store based on one or more similarities between the profile and the one or more other profiles in the data store;

employing the two or more similar profiles to determine one or more locations in the network associated with two or more documents that correspond to the two or more similar profiles based on the two or more similar profiles, wherein one or more of a known document repository or an unknown document repository at the one or more locations are progressively identified based on heuristics of the activity;

classifying the one or more locations based on the activity, the two or more similar profiles, and one or more access policies associated with each location, wherein the activity associated with accessing the document is classified as inconsistent based on the other activity associated with accessing the one or more other documents and the other activity includes one or more of a different access policy or another location that is less secure than the one or more locations;

employing one or more portions of the one or more locations that are classified as inconsistent with the one or more access policies to generate one or more reports that include information associated with one or more of the document, the activity, or the one or more locations classified as being inconsistent with the one or more access policies; and employing each quality score associated with each summarization model that is below a threshold value to initiate retraining of one or more portions of the one or more summarization models, wherein the retraining employs user feedback and one or more rules for an exclusion or an inclusion of a document type, a directory, or an application that are associated with document access activity.

25. The media of claim 24, wherein generating the profile, further comprises:

wherein the one or more characteristics of the activity associated with the document access include one or more of document sizes, patterns of access, meta-data visible in the network traffic, file system locations, user/session characteristics, content, semantic content, or similarities to other documents or associated activity; and employing the one or more summarization models to generate the one or more values that summarize the one or more characteristics the activity associated with the document access; and including the one or more values in the profile.

26. The media of claim 24, wherein determining the two or more similar profiles, further comprises:

providing one or more recognition models that are trained to recognize similarities between the profile and the one or more other profiles;

providing the profile and the one or more other profiles from the data store to the one or more recognition models; and determining the two or more similar profiles based on the one or more recognition models.

27. The media of claim 24, wherein classifying the one or more locations based on the activity further comprises:

determining a source location where the document is stored based on the activity associated with the document access;

determining one or more target locations where the document is stored as a result of the activity associated with the document access; and comparing a first access policy that is associated with the one or more source locations with a second access policy that is associated with the one or more target locations.

28. The media of claim 24, wherein classifying the one or more locations, further comprises:

determining one or more characteristics of the document based on the profile; and further classifying the one or more locations based on the one or more characteristics of the documents, wherein the one or more classified locations include one or more of a local directory in the file system, a shared directory in the file system, a removeable media storage device, or a File Transfer Protocol (FTP) server, or an object store in a cloud computing environment.

29. The media of claim 24, wherein determining the one or more locations in the network, further comprises:

determining one or more access requests based on the monitored network traffic; and determining the one or more locations based on a number of the access requests exceeding a threshold value.

30. The media of claim 24, wherein classifying the one or more locations in the network, further comprises:

determining one or more sensitive documents based on the monitored network traffic, wherein the one or more sensitive documents include one or more of a human resources document, a sales list, a customer list, or a trade secret; and further classifying the one or more locations based on an association with the one or more sensitive documents.

* * * * *